(12) United States Patent
Fukushima et al.

(10) Patent No.: US 8,427,532 B2
(45) Date of Patent: Apr. 23, 2013

(54) APPARATUS AND METHOD OF DISPLAYING THE THREE-DIMENSIONAL IMAGE

(75) Inventors: Rieko Fukushima, Tokyo (JP); Tatsuo Saishu, Tokyo (JP); Yuzo Hirayama, Tokyo (JE)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/414,880

(22) Filed: Mar. 8, 2012

(65) Prior Publication Data

US 2012/0169731 A1 Jul. 5, 2012

Related U.S. Application Data

(63) Continuation of application No. 12/051,510, filed on Mar. 19, 2008, now Pat. No. 8,154,587.

(30) Foreign Application Priority Data

Mar. 29, 2007 (JP) .................................. 2007-087864

(51) Int. Cl.
*H04N 13/04* (2006.01)
*H04N 13/00* (2006.01)

(52) U.S. Cl.
USPC .................................. 348/51; 348/42; 348/59

(58) Field of Classification Search .................. None
See application file for complete search history.

(56) References Cited

U.S. PATENT DOCUMENTS

| | | | |
|---|---|---|---|
| 7,265,775 B2 | 9/2007 | Hirayama | |
| 7,495,634 B2 | 2/2009 | Takagi et al. | |
| 7,643,552 B2 | 1/2010 | Saishu et al. | |
| 8,154,587 B2 * | 4/2012 | Fukushima et al. | ............ 348/51 |
| 2004/0150583 A1 | 8/2004 | Fukushima et al. | |
| 2005/0264651 A1 | 12/2005 | Saishu et al. | |
| 2006/0170616 A1 | 8/2006 | Hirayama et al. | |
| 2008/0079805 A1 | 4/2008 | Takagi et al. | |

FOREIGN PATENT DOCUMENTS

| | | |
|---|---|---|
| JP | 2003-288612 | 10/2003 |
| JP | 2004-40722 | 2/2004 |
| JP | 2004-212666 | 7/2004 |
| JP | 2005-331844 | 12/2005 |

OTHER PUBLICATIONS

M.G. Lippmann, "Comptes Rendus de l'Academie des Sciences", vol. 146(9), Mar. 2, 1908, pp. 446-451.
Hoshino et al., "Analysis of resolution limitation of integral photography", Optical Society of America, 1998, vol. 15, No. 8, pp. 2059-2065.

* cited by examiner

*Primary Examiner* — John B. Walsh
(74) *Attorney, Agent, or Firm* — Ohlandt, Greeley, Ruggiero & Perle, L.L.P.

(57) ABSTRACT

A three-dimensional image display apparatus displays element images each composed of a set of parallax component images. An exit pupil array is located opposite the display surface. Exit pupils of the array correspond to the respective element images. The horizontal pitch of the exit pupils or an integral multiple of the horizontal pitch is set equal or slightly smaller than an integral multiple of the horizontal pitch of pixels. The parallax component images are oriented in different directions via the exit pupil. Principal beams from the parallax component images via the exit pupils are emitted substantially parallel to one another. The element image contains substantially the same parallax image component in two pixel areas in which two adjacent parallax image components are otherwise displayed. The same parallax image component is oriented in different directions via the corresponding exit pupil.

9 Claims, 11 Drawing Sheets

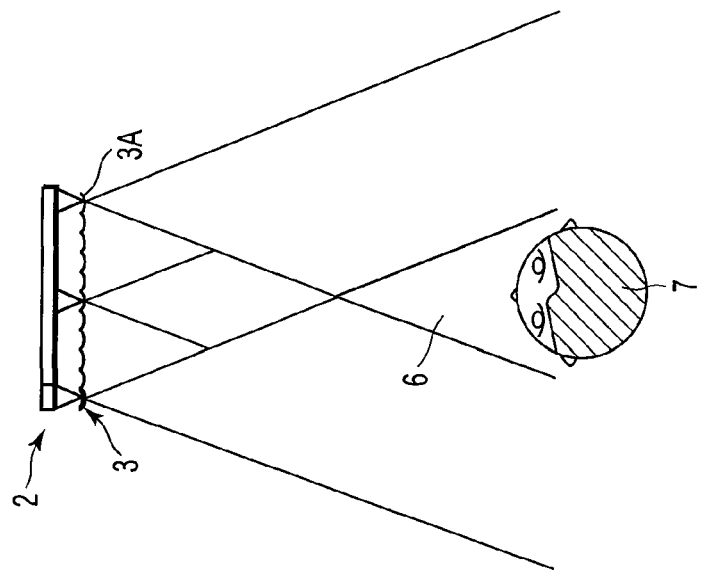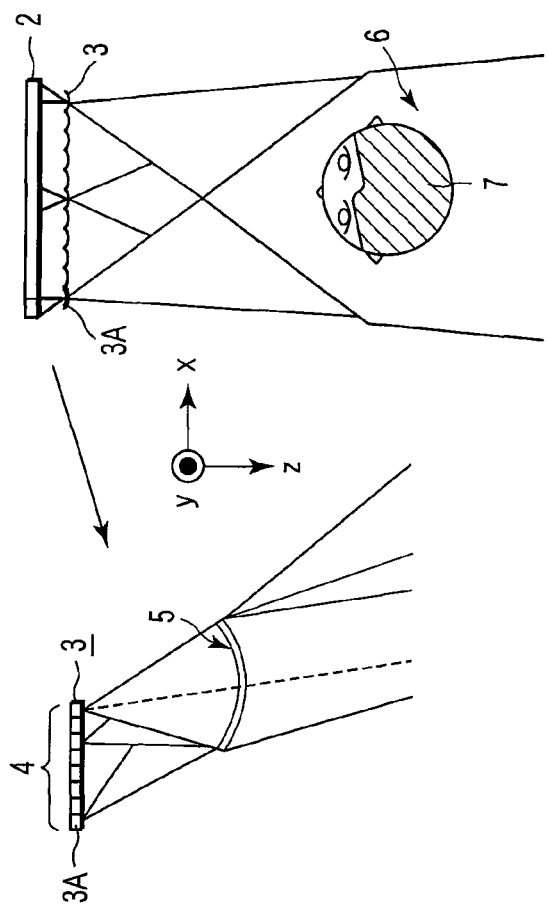
FIG. 4A
FIG. 4B
FIG. 4C

APPARATUS AND METHOD OF DISPLAYING THE THREE-DIMENSIONAL IMAGE

CROSS-REFERENCE TO RELATED APPLICATIONS

This application is a continuation of U.S. application Ser. No. 12/051,510, filed on Mar. 19, 2008, now pending, which is based upon and claims the benefit of priority from prior Japanese Patent Application No. 2007-087864, filed Mar. 29, 2007, the entire contents of both of which are incorporated herein by reference.

BACKGROUND OF THE INVENTION

1. Field of the Invention

The present invention relates to a three-dimensional image display apparatus and a method for displaying a three-dimensional image.

2. Description of the Related Art

In recent years, apparatuses have been developed which display three-dimensional images that can be observed with the naked eye. Naked-eye display apparatuses for three-dimensional images are known to be based on a twin lens scheme or a multi-lens scheme. In the twin lens or multi-lens three-dimensional image display apparatus, a beam control element such as a lenticular sheet (a flat protruding rod and lens array having lens properties only in a horizontal direction) or a parallax barrier is arranged opposite a display surface of the display apparatus with a gap between the beam control element and the display surface. With this apparatus, two-dimensional images offering parallaxes are separately incident on the right and left eyes so that an observer can perceive a "three-dimensional image that allows a three-dimensional object to be perceived in only one direction". With the twin lens display of a three-dimensional image, two two-dimensional images are observed from the observer's eye point in only one direction so that the observer can perceive a three-dimensional object. With the twin lens display of a three-dimensional image, the eye point is fixed, so that the moving observer cannot perceive the three-dimensional image. In contrast, by way of example, with the multi-lens display method for three-dimensional images allowing the three-dimensional image to be observed from eye points in three directions, four two-dimensional images are provided and the observer observes two of these two-dimensional images which correspond to each of the eye points in three directions. The observer can perceive the three-dimensional images from each eye point. Consequently, even the moving observer can be provided with movement parallaxes, which are inconsecutive. Here, the movement parallax is defined as a phenomenon in which an image of the object appears to be moving in a direction opposite to that in which the observer's body is moving.

A II (Integral Imaging) scheme is known to display three-dimensional images that allow the observer to be more appropriately provided with movement parallaxes. The II scheme is based on what is called an integral photography (IP) scheme proposed by M. G. Lippmann in Comptes Rendus de l'Academie des Sciences, Vol. 146, pp. 446-451 (1908), which relates to techniques for taking and reproducing three-dimensional photographs. The integral photography (IP) scheme is also called an integral imaging (II) scheme. With the integral imaging scheme, such a lens array as correspond to pixels in a three-dimensional photograph is provided. A film is then placed at the position of the focal distance of the lens array, and an image of the subjected is picked up. The lens array used for the image pickup is placed on the film subjected to the image pickup. The image of the subject is then three-dimensionally reproduced. With the II scheme, beam information recorded on the film via the lenses contains beam traveling directions during the image pickup. Consequently, during display, the beam traveling directions during the image pickup are reversed to emit beams to a space through the film, allowing a three-dimensional image to be reproduced. As is apparent from this process, provided that an observation position in the space is not fixed and that the film has a sufficient resolution, a perfect spatial image can be reproduced as in the case of holography. The II scheme is considered to be an ideal display scheme that allows three-dimensional images to be spatially displayed without limiting the observation position.

A three-dimensional image display apparatus based on the II scheme uses a liquid crystal display (LCD) as a flat panel display, in place of the film. A lens array is located in front of the liquid crystal display as a beam control element with a gap between the lens array and the liquid crystal display. Beams emitted by pixels in the liquid crystal display are incident on a lens, which limits the traveling direction of the beams. The beams are thus emitted toward the space, allowing a three-dimensional image to be displayed in the space in front of the display or behind the display. With the three-dimensional image display apparatus based on the II scheme, as disclosed in H. Hoshino, F. Okano, H. Isono, and I. Yuyama, Opt. Soc. Am. A., Vol. 15, pp. 2059-2065 (1998). NHK, an increase in the number of pixels arranged behind the lens, that is, the number of pieces of parallax image information (parallax component images that are differently viewed depending on viewing angle) increases the display range in front of or behind (rear surface side) the display, where a three-dimensional image is displayed. However, with the resolution of LCD fixed, lens pitch increases to reduce the resolution of the three-dimensional image. In particular, a one-dimensional II (1D-II) scheme which provides parallax information only in a horizontal direction and which is different from the multi-lens scheme may be confused with the multi-lens scheme, which is considered to belong to the same category as that of the 1D-II scheme owing to the use of a lenticular sheet.

However, the II scheme is characterized by increasing the number of parallaxes to as large a value as possible taking a decrease in the definition of eye point images, and avoiding assuming the observer's position for beam design, that is, avoiding providing beam converging points at positions corresponding to the respective eyes during observation. This characteristic is definitely different from that of the multi-lens design in which the number of parallaxes is set at a smaller value between 2 and 4 in order to inhibit a decrease in the definition of parallax images and in which the beam converging points are provided at the positions corresponding to the respective eyes to allow a three-dimensional image to be perceived.

Specifically, according to the multi-lens scheme, the lens pitch (Ps) along the horizontal direction is designed to be smaller than an integral multiple of horizontal pixel pitch (Pp) (m×Pp: m is a natural number equal to or greater than 3). The ratio of the lens pitch to the horizontal pixel pitch is determined by the ratio of the focal distance g of the lens array to observing visual distance L. That is, the following formula (1) is given, $$Ps : m \times Pp = L : (L+g) \quad (1)$$

wherein m denotes an integer equal to or greater than 3.

Owing to the relationship expressed by Formula (1), m converging points are generated at the observing visual distance L. The distance between the adjacent beam converging points is equal to the inter-eye distance. This necessarily determines the value of g.

On the other hand, with the II scheme, the lens pitch (Ps) along the horizontal direction or an integral multiple of the lens pitch (Ps) (n×Ps: n denotes an integer equal to or greater than 1) is designed to be equal to an integral multiple of horizontal pixel pitch (Pp) (m×Pp: m is a natural number equal to or greater than 3). That is, the following formula (2) is given, $$Ps=m/n\times Pp \tag{2}$$

wherein n denotes an integer equal to or greater than 1. m denotes an integer equal to or greater than 3.

Since the relationship expressed by Formula (1) is established, beams are emitted from a plurality of lenses so as to establish a parallel relationship. That is, no such special beam converging points on which beams are converged are provided at the visual distance. Thus, at any observation position, the observer can view a three-dimensional image that is to be substantially viewed from that position on the basis of the sum of beams incident on the eye. That is, consecutive movement parallaxes can be realized. Similar effects are expected to be exerted when the beam converging points are arranged at a distance sufficiently farther than the observing distance.

Thus, with the II scheme, beams are reproduced so as to be discretely extracted from a surface on which an object is actually present. Consequently, when the number of parallaxes increases to and above a certain value, the observer can view a binocular eye point image that can be substantially viewed from the observation position within the observation range. The observer can also obtain consecutive movement parallaxes. With the multi-lens scheme, importance is attached to the definition of the eye point image, resulting in incomplete movement parallaxes. In contrast, with the 1D-II scheme, which does not provide any special beam-converging points, the balance between the binocular parallax and the movement parallax is taken into account for design. This allows the display of more natural images that prevent the observer from feeling fatigued.

Thus, the large number of parallaxes is one of the characteristics of the display apparatus displaying three-dimensional images on the basis of the II scheme. The large number of parallaxes means (A) the long distance between adjacent lenses corresponding to pixels in a three-dimensional image, that is, the lens pitch set at a large value, and (B) the large number of directions in which parallax information required to display a three-dimensional image is acquired. For the former (A), as described in JP-A 2004-040722 (KOKAI), the horizontal pitch at which parallax information is presented is set equal to the distance between sub-pixels (an R pixel, a G pixel, and a B pixel), to reduce the distance between the adjacent lenses. For the latter (B), as described in JP-A 2003-288612 (KOKAI), the design in which beams are emitted substantially parallel to one another is adopted to efficiently acquire parallax information while preventing beam converging points from being generated in an observation area. With this design, parallel-projection eye point images can be used to efficiently acquire pieces of parallax information to be displayed at pixels for which beam directions are in a parallel relationship.

In connection with the parallel-projection II scheme, JP-A 2004-212666 (KOKAI) discloses a method for optimizing the layout of a group of display pixels at which element images corresponding to lenses are displayed and pieces of parallax information displayed at the grouped display pixels, depending on the positions of the lenses on a display surface of the three-dimensional image display apparatus, in order to enlarge an area in which a three-dimensional image can be observed at a finite visual distance, that is, a viewing area. Here, the element images mean a set of parallax component images each corresponding to a single lens. A problem with the display apparatus disclosed in JP-A 2004-212666 (KOKAI) is an increase in the number of directions in which parallax images are acquired. The increase in the number of directions in which multi-eye-point images are acquired may increase the amount of rendering loads if each eye point image is rendered by CG. This may affect scenes that require a high processing speed such as in real-time rendering. Also for live action, the increase in the number of directions in which multi-eye-point images may disadvantageously increase the amount of image pickup loads.

As a method for reducing the number of parallaxes, JP-A 2005-331844 (KOKAI) proposes a method of replacing some of the parallax component images in accordance with the II scheme with twin lens or multi-lens images. That is, according to the method disclosed in JP-A 2005-331844 (KOKAI), the grouped display pixels at which the element images are displayed, parallax information from the same projection eye point image is assigned to at least three pixels arranged at the same position. However, with this method, strictly speaking, the direction of each beam does not match the corresponding parallax information, unavoidably degrading image quality. In general, whether the lenses or slits are arranged in front of the display panel, it is difficult to limit the number of pixels observed by the observer via one exit pupil, that is, the number of pieces of parallax information, to one, in connection with the curvature of an image surface or the aperture. That is, disadvantageously, the observer may actually view at least two pixels via the one exit pupil. The phenomenon in which the observer views at least two pixels via the one exit pupil is called cross talk in the II scheme. The proposal in JP-A 2005-331844 (KOKAI) assigns the same piece of parallax information to at least three pixels taking the cross talk into account.

Another problem is that an image exceeding a protrusion or depth limit as defined in H. Hoshino, F. Okano, H. Isono, and I. Yuyama, J. Opt. Soc. Am. A., Vol. 15, pp. 2059-2065 (1988). NHK is viewed as a multiple image. This problem occurs because the intervals (angles) at which parallax information is presented needs to be reduced in order to display a three-dimensional image with a significant protrusion or depth but because the intervals (angles) are insufficient. However, because of the above-described cross talk, significant parallaxes may make the three-dimensional image appear multiplied.

As described above, the method for displaying three-dimensional images utilizing multiple parallaxes on the basis of the II scheme disadvantageously imposes the heavy burden of creating two-dimensional images to be displayed on the display panel. The three-dimensional image display apparatus offering multiple parallaxes so as to enable three-dimensional viewing with the naked eye disadvantageously makes an image appear multiplied when the image is displayed with the protrusion or depth display limit exceeded. That is, with the three-dimensional image display apparatus based on the II scheme, beams are set to have a substantially parallel relationship, increasing the number of directions in which eye point images are acquired as well as the amount of rendering loads.

BRIEF SUMMARY OF THE INVENTION

An aspect of the present invention provides a three-dimensional image display apparatus comprising:

a display device configured to display a two-dimensional image, the display device having a display surface on which a large number of pixels are arranged in a matrix at a horizontal pixel pitch and a vertical pixel pitch, the two-dimensional image including a plurality of element images displayed on the display surface, each of the element images comprising a set of parallax component images;

an exit pupil array having a plurality of exit pupils provided in association with the respective element images, the exit pupil array being located opposite the display surface and having a vertical pupil pitch, a horizontal pupil pitch, an integral multiple of the vertical pupil pitch or an integral multiple of the horizontal pupil pitch, the vertical pupil pitch or the integral multiple of the vertical pupil pitch being set substantially equal to a integral multiple of the vertical pixel pitch, the horizontal pupil pitch or the integral multiple of the horizontal pupil pitch being set substantially equal to a integral multiple of the horizontal pixel pitch, the element images being projected on a viewing area defined in front of the display surface via the exit pupils, parallax component images in each of the element images being oriented in different directions via the corresponding exit pupil, principal beams from the parallax component images via the respective exit pupils being emitted substantially parallel to one another; and a generating section configured to generate a display image signal, which allows the display device to display the element images, the element image containing substantially the same parallax image components which are displayed in two adjacent pixel areas of the pixels, the display image generating section projecting the same parallax image component in different directions via the exit pupil.

Another aspect of the present invention provides a three-dimensional image display apparatus comprising:

a display device configured to display a two-dimensional image, the display device having a display surface on which a number of pixels are arranged in a matrix at a horizontal pixel pitch and a vertical pixel pitch, the two-dimensional image including a plurality of element images displayed on the display surface, each of the element images comprising a set of parallax component images;

an exit pupil array having a plurality of exit pupils provided in association with the respective element images, the exit pupil array being located opposite the display surface and having a vertical pupil pitch, a horizontal pupil pitch, an integral multiple of the vertical pupil pitch or an integral multiple of the horizontal pupil pitch, the vertical pupil pitch or the integral multiple of the vertical pupil pitch being set substantially equal to a integral multiple of the vertical pixel pitch, the horizontal pupil pitch or the integral multiple of the horizontal pupil pitch being set substantially equal to a integral multiple of the horizontal pixel pitch, the element images being projected on a viewing area defined in front of the display surface via the exit pupils, the parallax component images in each of the element images being oriented in different directions via the corresponding exit pupil, principal beams from the parallax component images via the respective exit pupils being emitted so as to be converged at least two points at an observing viewing distance; and a generating section configured to generate a display image signal, which allows the display device to display the element images, the parallax component images being distributively generated from one eye point image acquired from a beam converging position, the element image containing substantially the same parallax image components which are displayed in two adjacent pixel areas of the pixels, the generating section projecting the same parallax image component in different directions via the exit pupil.

Another aspect of the present invention provides a method for displaying a plurality of element images on a three-dimensional image display apparatus comprising:

a display device configured to display a two-dimensional image, the display device having a display surface on which a number of pixels are arranged in a matrix at a horizontal pitch and a vertical pitch, the plurality of element images being displayed on the display surface, each of the element images comprising a set of parallax component images; and an exit pupil array having a plurality of exit pupils provided in association with the respective element images, the exit pupil array being located opposite the display surface and having a vertical pupil pitch, a horizontal pupil pitch, an integral multiple of the vertical pupil pitch or an integral multiple of the horizontal pupil pitch, the vertical pupil pitch or the integral multiple of the vertical pupil pitch being set substantially equal to a integral multiple of the vertical pixel pitch, the horizontal pupil pitch or the integral multiple of the horizontal pupil pitch being set substantially equal to a integral multiple of the horizontal pixel pitch, the element images being projected on a viewing area defined in front of the display surface via the exit pupils, the element images being projected on a viewing area defined in front of the display surface, via the exit pupils, parallax component images in each of the element images being oriented in different directions via the corresponding exit pupil, principal beams from the parallax component images via the respective exit pupils being emitted substantially parallel to one another, the method comprising:

arranging the element images each containing substantially the same parallax image components which are displayed in two adjacent pixel areas of the pixels, and projecting the same parallax image components in different directions via the exit pupil.

Another aspect of the present invention provides a method for displaying a plurality of element images on a three-dimensional image display apparatus comprising:

a display device configured to display a two-dimensional image, the display device having a display surface on which a number of pixels are arranged in a matrix at a horizontal pitch and a vertical pitch, the plurality of element images being displayed on the display surface, each of the element images comprising a set of parallax component images; and an exit pupil array having a plurality of exit pupils provided in association with the respective element images, the exit pupil array being located opposite the display surface and having a vertical pupil pitch, a horizontal pupil pitch, an integral multiple of the vertical pupil pitch or an integral multiple of the horizontal pupil pitch, the vertical pupil pitch or the integral multiple of the vertical pupil pitch being set substantially equal to a integral multiple of the vertical pixel pitch, the horizontal pupil pitch or the integral multiple of the horizontal pupil pitch being set substantially equal to a integral multiple of the horizontal pixel pitch, the element images being projected on a viewing area defined in front of the display surface via the exit pupils, the element images being projected on a viewing area defined in front of the display surface, via the exit pupils, parallax component images in each of the element images being oriented in different directions via the corresponding exit pupil, principal beams from the parallax component images via the respective exit pupils being emitted substantially parallel to one another, the method comprising:

distributively generating the parallax component images from one eye point image acquired from a beam converging position, arranging the element images each containing substantially the same parallax image components which are displayed in two adjacent pixel areas of the pixels, the display image generating section projecting the same parallax image component in different directions via the exit pupil.

BRIEF DESCRIPTION OF THE SEVERAL VIEWS OF THE DRAWING

FIGS. 4A to 4C are diagrams illustrating a viewing area width in the three-dimensional image display apparatus shown in FIG. 1, wherein FIG. 4A shows the relationship between a group of pixels provided behind a lens 3A and the directions of beams emitted from the pixels, FIG. 4B shows the positional relationship between the lens 3A and element images observed when the viewing area width is maximized at a short visual distance, and FIG. 4C shows the positional relationship between the lens 3A and the element images observed when the viewing area width is maximized at a long visual distance;

FIGS. 6A to 6C are correlation diagrams showing how parallax information and a screen are viewed in accordance with the II scheme, wherein FIG. 6A shows how parallax component images are viewed at a certain visual distance, FIG. 6B shows how the screen is viewed at a certain visual distance (when the amount of cross talk from an exit pupil is 1 (C=1)), and FIG. 6C shows how the screen is viewed at a certain visual distance (when the amount cross talk from the exit pupil is 2 (C=2));

FIGS. 7A to 7C are correlation diagrams showing how parallax information and the screen are viewed in accordance with the II scheme if the method in accordance with the comparative example is applied, wherein FIG. 7A shows how parallax component images are viewed at a certain visual distance, FIG. 7B shows how the screen is viewed at a certain visual distance (when the amount of cross talk from the exit pupil is 1 (C=1)), and FIG. 7C shows how the screen is viewed at a certain visual distance (when the amount of cross talk from the exit pupil is 2 (C=2)), FIGS. 8A to 8C are correlation diagrams showing how parallax information and the screen are viewed on the display apparatus shown in FIG. 1 if the method in accordance with the embodiment of the present invention is applied to the II scheme, wherein FIG. 8A shows how parallax component images are viewed at a certain visual distance, FIG. 8B shows how the screen is viewed at a certain visual distance (when the amount of cross talk from the exit pupil is 1 (C=1)), and FIG. 8C shows how the screen is viewed at a certain visual distance (when the amount of cross talk from the exit pupil is 2 (C=2))

FIGS. 10A to 10C are diagrams illustrating how parallax information is viewed on the display apparatus shown in FIG. 1 if the method in accordance with the embodiment of the present invention is applied to the multi-lens display in accordance with the II scheme, wherein FIG. 10A shows how parallax component images are viewed at a certain visual distance, FIG. 10B shows how the screen is viewed at a certain visual distance (when the amount of cross talk from the exit pupil is 1 (C'=1)), and FIG. 10C shows how the screen is viewed at a certain visual distance (when the amount of cross talk from the exit pupil is 2 (C'=2));

DETAILED DESCRIPTION OF THE INVENTION

Figure 1:
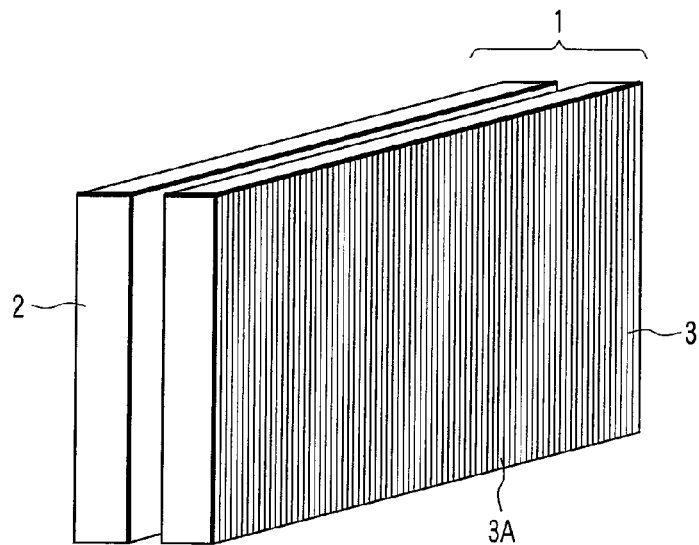
FIG. 1 is a perspective view schematically showing a three-dimensional image display apparatus in accordance with an embodiment of the present invention.

With reference to the drawings as required, description will be given below of a three-dimensional image display apparatus, a method for displaying a three-dimensional image, and a method for creating a multi-eye-point image used to display a three-dimensional image, in accordance with an embodiment of the present invention.

In the drawings, components having similar functions are denoted by the same reference numerals, and duplicate descriptions are omitted.

FIG. 1 is a perspective view schematically showing a three-dimensional image display apparatus to which an embodiment of the present invention is applied.

As shown in FIG. 1, a three-dimensional image display apparatus 1 comprises a flat panel display such as a liquid crystal display (LCD), that is, a display section, and a beam control element 3 located in front of the flat panel display 2 with a gap between the flat panel display 2 and the beam control element 3. According to a two-dimensional II scheme, the beam control element 3 corresponds to a lens array in which segment lenses 3A are arranged in a matrix or a pin hole array in which pin holes are arranged like an array. According to a one-dimensional II scheme, the beam control element 3 corresponds to a lenticular sheet made up of cylindrical lenses extending in a vertical direction and arranged in a horizontal direction or a slit plate having slits extending in the vertical direction and arranged in the horizontal direction. Regardless of whether the beam control element 3A is the lens array or the lenticular sheet or the slit plate, each of the lenses 3A or slits can be optically handled as an exit pupil of an optical opening.

Pixels are arranged on a display surface of the flat panel display (display section) 2 in a matrix at a substantially fixed horizontal pitch pp and a substantially fixed vertical pitch. Vertical stripe color filters are arranged on respective picture elements (R, G, and B sub-pixels) constituting the pixels, so as to constitute a high-definition liquid crystal panel module. Element images made up of parallax component images are displayed on the panel module to show a three-dimensional image.

With the three-dimensional image display apparatus configured as described above, when a position from which an observer observes the three-dimensional image display apparatus is assumed to be close to a position in a viewing area surface, the observer can observe a three-dimensional image in the vicinity of a front surface and a rear surface of the display section 2. That is, the element images as a set of parallax component images are displayed at the respective pixels on the display section 2 which correspond to the respective exit pupils. Beams from the element images are controlled or regulated by the exit pupils so as to travel to the observer. The beams oriented in the direction in which the observer is positioned transmit the parallax component images, which are perceived by the observer to perceive a three-dimensional image. That is, the beams from the element images contribute to forming the three-dimensional image displayed between the beam control element 3 and the observer or the three-dimensional image displayed behind the display section 2.

According to the II scheme, the element images corresponding to the exit pupils are defined in a horizontal surface. According to the II scheme, unlike the multi-lens scheme, parallel beams are emitted to the viewing area to form a three-dimensional image in the viewing area. With either the II scheme or the multi-lens scheme, beams emitted from the element image via the corresponding exit pupil are regulated by the exit pupil but are divergently directed to the viewing area. However, according to the II scheme, when attention is paid to a beam from one exit pupil oriented in a certain direction, beams parallel to this beam are similarly emitted from the other corresponding exit pupils. In contrast, according to the multi-lens scheme, beams from the optical openings are focused on at least three focusing points on an observing reference line. With the multi-lens system, the observer can observe a three-dimensional image as long as the observer's eyes are positioned at the focusing points. However, when the eyes are located away from the focusing points, the observer cannot observe the three-dimensional image. In contrast, with the II scheme, as long as the observer is positioned in the viewing area, parallax component images corresponding to the observer's position are transmitted to the observer through the beams from the optical openings. The observer then perceives the three-dimensional image as a set of the parallax component images. Therefore, the element images are defined as a set of parallax component images as described below. The beams from the parallax component images are controlled by the exit pupil so as to travel in predetermined directions. The observer in the viewing area is thus provided with parallaxes. The display section 2 displays a parallax synthesis image as a set of the element images. The parallax component images are incident on the observer's eyes in association with the observer's position in the viewing area. As a result, the observer can perceive the three-dimensional image.

Figure 2:
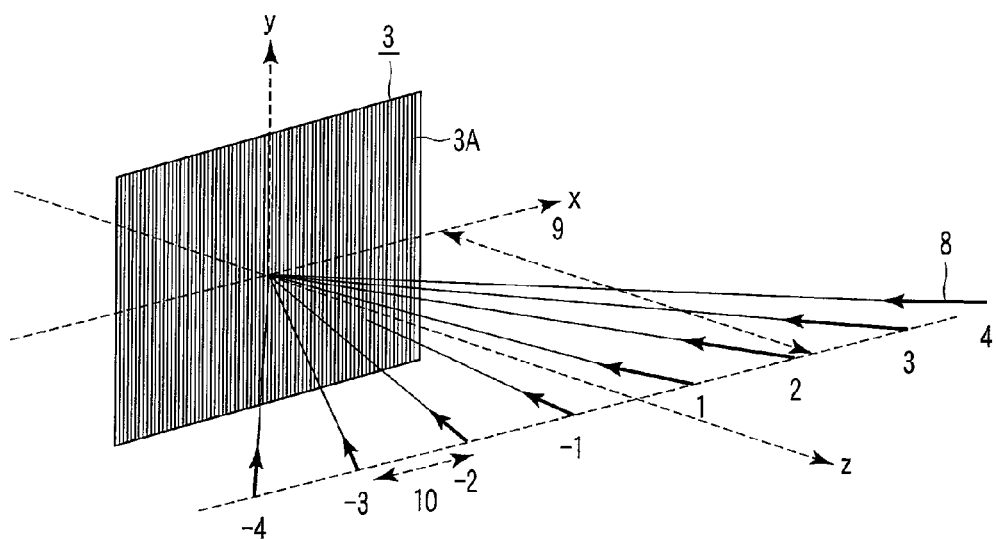
FIG. 2 is a diagram showing, as a comparative example, directions in which parallax component images are acquired by the display apparatus shown in FIG. 1.
Figure 3:
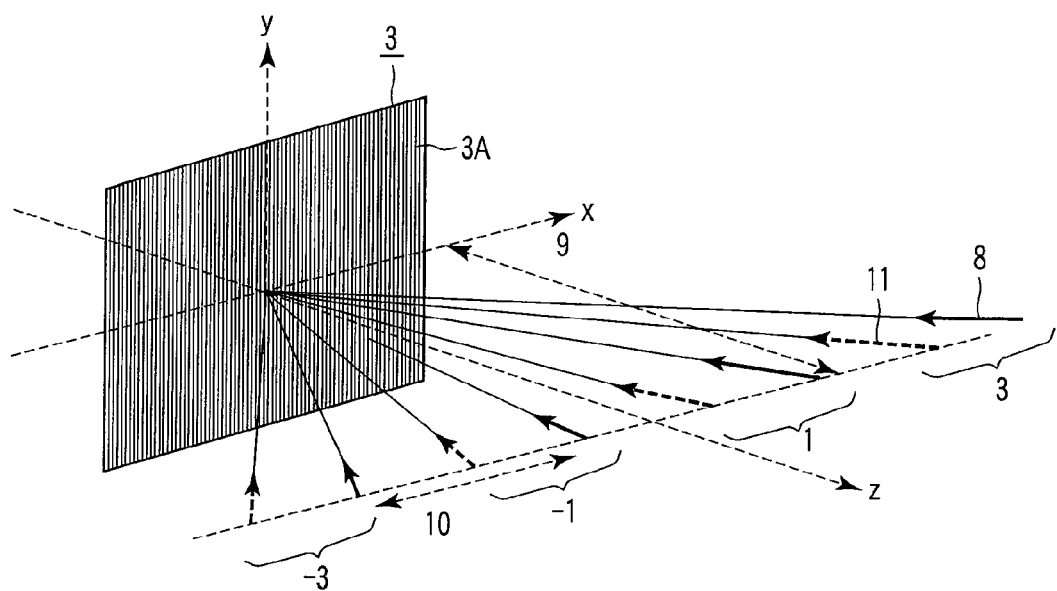
FIG. 3 is a diagram illustrating directions in which parallax component images are acquired by the three-dimensional image display apparatus shown in FIG. 1 when parallax component images are decimated by a three-dimensional image display method in accordance with an embodiment of the present invention.

Description will be given of the three-dimensional image display apparatus based on the II scheme in accordance with the embodiment of the present invention. For a particular model described below, acquiring directions (parallax acquiring directions corresponding to parallax numbers −4, −3, −2, −1, 1, 2, 3, and 4) for eye point images that need to be acquired in a plurality of directions as shown in FIG. 2 are reduced to every other eye point image acquiring directions or fewer eye point image acquiring directions as shown in FIG. 3. The same-eye-point parallax component image is assigned to a display area on the display section 2 in which at least two adjacent parallax component images are otherwise displayed. By way of example, in FIG. 3, the eye point image acquiring directions are reduced to every other directions (corresponding to parallax numbers −3, −1, 1, and 3), and the parallax component images (corresponding to the parallax numbers −3, −1, 1, and 3) for the same eye point are displayed in an area in which two adjacent parallax component images are otherwise displayed. That is, as shown in FIG. 3, parallax number −3 is displayed in the area in which parallax numbers −4 and −3 are otherwise displayed as shown in FIG. 2. As shown in FIG. 3, parallax number −1 is displayed in the area in which parallax numbers −4 and −3 are otherwise displayed as shown in FIG. 2. As shown in FIG. 3, parallax number 1 is displayed in the area in which parallax numbers 1 and 2 are otherwise displayed as shown in FIG. 2. As shown in FIG. 3, parallax number 3 is displayed in the area in which parallax numbers 4 and 3 are otherwise displayed as shown in FIG. 2. Consequently, the two-dimensional display data displayed in the display section 2 allows a reduction in loads associated with the acquisition of parallax information to half or less.

In the example shown in FIG. 2, eight parallax component images with parallax numbers −4 to 4 are displayed in a display area in which a certain element image is to be displayed. However, also in an example in which Nc parallax component images with parallax numbers −Nc/2 to Nc/2 are displayed as in the case of FIG. 3, the Nc/2 parallax component images with odd or even numbers are displayed on the display surface of the two-dimensional display device 2 so as to lie consecutively and adjacent to one another. Here, Nc denotes an integer and corresponds to the number of multi-eye-point cameras as described below.

With sufficiently many parallax component images and with such a special model as described below, the same parallax component image may be displayed in at least two areas in which parallax component images with different parallax numbers are displayed, for example, in three areas in which parallax component images with different parallax numbers are displayed, if a normal model is used. This makes it possible to prevent a three-dimensional image from being multiplied.

With motion pictures, once a display with the normal model is switched to a certain frame containing such a special model as described below, the number of parallax component images is limited so that the resulting parallax component images correspond to every other eye point acquiring directions or fewer eye point acquiring directions. The same-eye-point parallax component image is assigned to the display area on the display section 2 in which at least two adjacent parallax component images are otherwise displayed.

As described above, presenting the same parallax information to the adjacent display areas makes it possible to prevent the multiplication of a three-dimensional image exceeding a protrusion limit or a depth limit. However, this may disadvantageously eliminate consecutive movement parallaxes, which is an advantage of the II scheme, causing the three-dimensional image to flip with respect to movement of the observation position (incomplete movement parallaxes). In view of these problems, the display apparatus displaying three-dimensional images in accordance with the embodiment of the present invention preferably reassigns the parallax component images such that when the model illustrated below is displayed, the same-eye-point parallax component image is assigned to the display area on the display section 2 in which at least two adjacent parallax component images are otherwise displayed.

(1) Model with a Significant Protrusion or a Significant Depth

When the display position which is defined as z is larger than the protrusion limit which is defined as Dn, a following formula can be used as a model with a significant protrusion, wherein the observing visual distance is defined as L, the gap between the beam control element and the display surface is defined as g, the sub-pixel width is defined as Pp, and the spatial frequency of the model is defined as βuser.

$$z \Box Dn = L / \{2 \times ((L+g)/L) \times Pp/g \times \beta user + 1\}$$

When the display position z is smaller than the Depth limit Df, a following formula can be used as a model with a significant depth.

$$z \Box Df = L / \{2 \times ((L+g)/L) \times Pp/g \times \beta user + 1\}$$

Here, βuser is the frequency of the model and can thus be optionally set. A more real display can be obtained by setting βuser at 300 to 350 cpr. However, βuser cannot be set greater than the maximum displayable frequency (βmax) determined on the basis of the lens pitch of the three-dimensional image display apparatus (Table 1).

(2) Model Imposing Heavy Loads on Real-Time Rendering

Where frame rate obtained when parallax information is located at each sub-pixel is defined as fo [fps], the number of sub-pixels at which the same parallax information is displayed is defined as x, and the rate of dependence on the number of multi-eye-point cameras is defined as y, the final frame rate f[fps] is given by:

$$f = F(x, y) \qquad (3)$$
$$= f0 \times 1 / \{(1-y) + y \times 1/x\}$$

x is adjusted so as to obtain the desired frame rate. A typical model imposing heavy rendering loads (the model likely to reduce the frame rate) has a large number of polygons.

For the model with the significant protrusion or the significant depth described in (1), the displayed three-dimensional image is provided with movement parallaxes, which are inconsecutive. However, with the model (display image) with the significant protrusion or the significant depth, an image with multiplication inhibited is visually preferable in spite of the inconsecutive movement parallaxes. On the basis of this visual reason, the display provided by the display apparatus in accordance with the embodiment of the present invention is applied to the model with the significant protrusion or the significant depth in (1).

Furthermore, for the model imposing heavy loads on rendering as described in (2), the consecutive movement parallaxes are a property required particularly for high-quality still three-dimensional images. For the display of motion pictures involving almost no such event as the observer's changing the observation position during a frame display period, the need for the consecutive movement parallaxes is reduced but a high refresh rate is required.

Even with the eye point image acquiring directions (parallax acquiring directions) decimated, the above-described model enables a reduction in cross talk without affecting image quality.

Now, description will be given of the inventor's idea leading to the presentation of the same parallax information, that is, the same parallax component image, in the adjacent display areas, with reference to the principle of the display of three-dimensional images in accordance with the II scheme.

The one-dimensional (1D-II scheme) will be described below for simplification.

According to the 1D-II scheme (one-dimensional II scheme), pieces of parallax information based on the II scheme, that is, parallax component images, are assigned to the pixels along the horizontal direction. In the vertical direction, pieces of twin lens or multi-lens parallax information, that is, parallax component images, are provided. The parallax information based on the II scheme can be described with reference only to a horizontal sectional view. Accordingly, to apply the idea of the present invention to the two-dimensional II scheme (2D-II scheme), it is possible to also apply the concept of reassignment of the parallax component in the horizontal direction to the vertical direction.

First, the effects of (1) will be described.

FIGS. 4A to 4C show how parallax information is viewed in accordance with the 1D-II scheme (horizontal sectional view). The lenticular lenses 3A are arranged in front of the panel. FIGS. 4A to 4C schematically show the range of parallax information which can be observed by the observer 7 via the lenses 3A. When the observer moves rightward or leftward, the sub-pixels (R, G, and B picture elements) observed via the lenses 3A change. With the 1D-11 scheme, beams emitted from the lenses 3A are in a parallel relationship. Consequently, when the observer views the parallax information in a projective manner, the position viewed via the lenses 3A varies slightly depending on each of the lenses 3A (arranged on the lenticular sheet). In other words, the position at which the parallax information is presented is shifted on the display panel by a distance equal to the lens pitch, depending on each of the lenses 3A. Furthermore, to maximize the viewing area width at a finite visual distance, the layout of a group of element image display pixels for displaying the element image corresponding to the lens 3A varies depending on the position of the lens 3A.

FIG. 4A shows how an element image displayed at an end of the display surface of the display apparatus shown in FIG. 1 and corresponding to one of the lenses 3A is displayed on the display panel so as to lie outside this lens 3A. Furthermore, FIGS. 4B and 4C qualitatively show the viewing area at a set visual distance varies on the basis of the difference in the position at which the parallax information corresponding to each of the lenses 3A is presented on the display surface. If a shorter visual distance is set in order to maximize the viewing area as shown in FIG. 4B, then comparison with FIG. 4C clearly shows that the lens 3A and the position of the corresponding pixel group for displaying the element image are in a more deviating relationship, that is, a more distant relationship.

Figure 5:
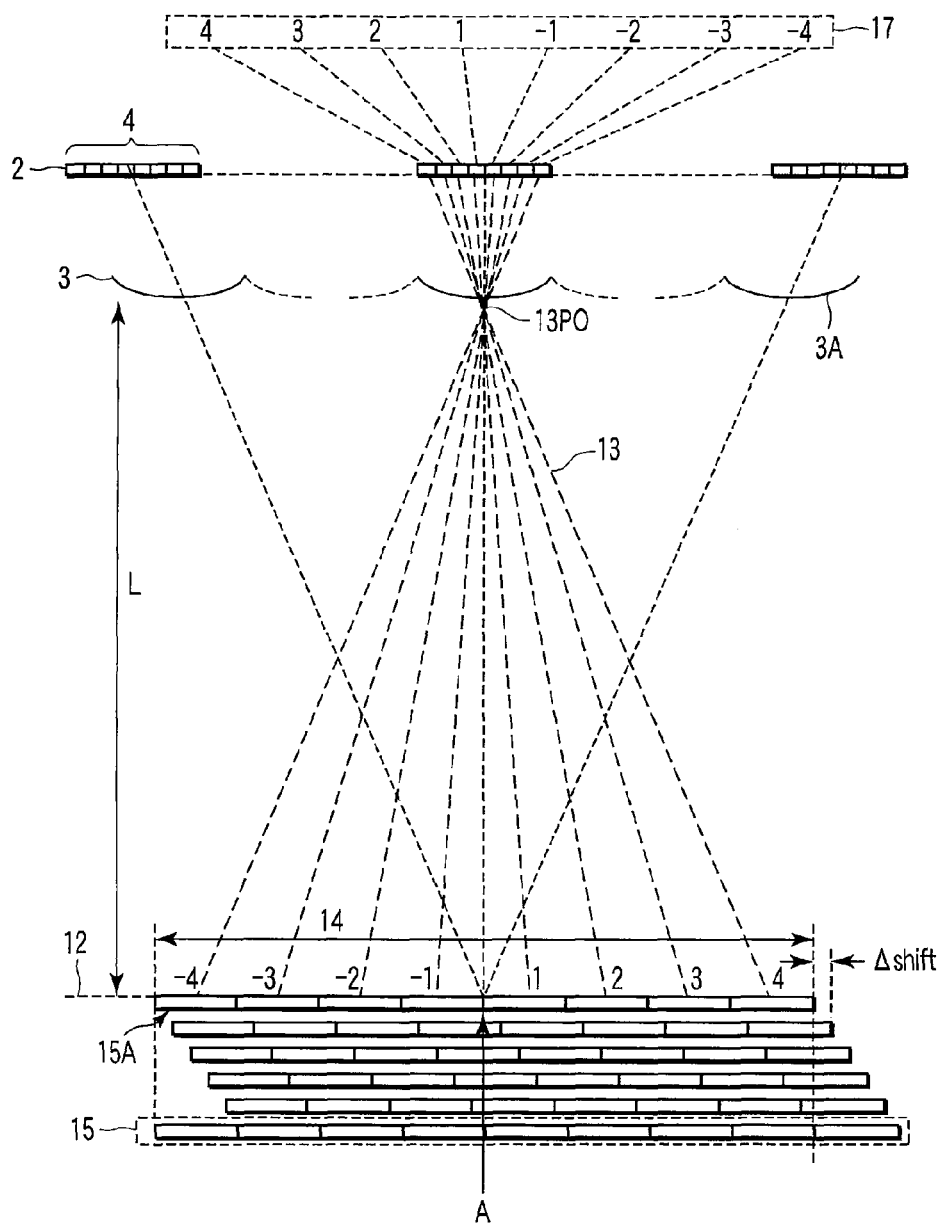
FIG. 5 is a diagram illustrating how parallax information is viewed on the display apparatus shown in FIG. 1, in accordance with an II scheme.

FIG. 5 shows a schematic diagram illustrating that the position at which parallax information characteristic of the 1D-II scheme and provided by each of the lenses 3A in a three-dimensional image display apparatus in a comparative example is presented on a viewing area surface 12 appears shifted. In FIG. 5, parallax information is provided on the display surface of the display panel 2, so that the pieces of parallax information, that is, the parallax component images, are displayed at the respective pixels. The parallax information is specified by the parallax direction, corresponding to an image pickup direction. In FIG. 5, pieces of parallax information are specified by parallax numbers (4, 3, 2, 1, −1, −2, −3, −4) indicating eight parallax directions corresponding to respective image pickup numbers. The pieces of parallax information that is, parallax component images having the parallax numbers (4, 3, 2, 1, −1, −2, −3, −4), are provided at the respective pixels on the display panel 2, which constitute a pixel group 4. The lenses 3A are arranged in association with the pixel groups 4. Parallax information 15 is projected, through the lenses 3A, on a viewing area surface 12 located at a visual distance L from the lenses 3A.

FIG. 5 shows a viewing area width 14 on the viewing area surface 12 over which the element images displayed at the grouped pixels 4 are projected. A normal three-dimensional image can be observed within the range determined by the viewing area width 14. Principal beams 13 containing parallax information from the pixels constituting the pixel group 4 are directed to the viewing area surface 12 through a main point 13PO of the lens 3A. Thus, the parallax information displayed on the display surface of the display panel 2 is projected on the display surface as the pieces of parallax information 15 having the reversed parallax numbers (−4, −3, −2, −1, 1, 2, 3, 4). On an observation side including the viewing area surface 12, parallax component images having the parallax numbers (4, 3, 2, 1, −1, −2, −3, −4) are projected from one of the lenses 3A to generate projected parallax component images 15A as the pieces of parallax information 15 having the parallax numbers (4, 3, 2, 1, −1, −2, −3, −4). Similarly, projected parallax component images 15A are generated by the adjacent lens 3A. As many projected parallax component images 15A as the lenses 3A are generated on the viewing area surface.

The pitch of the exit pupils of the lenses 3 is set n (n: a natural number equal to or greater than 2) or m/n (m: a natural number equal to or greater than 1) times as large as the pixel width in the same direction so that the principal beams 13 specified by the same parallax number are emitted from the lens 3A substantially parallel to one another. In the example shown in FIG. 5, the pixel group 4 is composed of eight pixels at which pieces of parallax information 17, that is, parallax component images having the parallax numbers (−4, −3, −2, −1, 1, 2, 3, 4). Accordingly, the lenses 3A are arranged on the lenticular sheet so that the exit pupils of the lenses 3A are arranged at a pitch 8 times (n=8) as large as the pixel width. For the other optical openings, for example, apertures, an aperture pitch is similarly set n (n: a natural number equal to or greater than 2) or m/n (m: a natural number equal to or greater than 1) times as large as the pixel width. Even with the m/n times as large as the pixel width, every n/m exit pupils have the same layout as that of every n/m pixels.

Since the principal beams emitted from the lens 3A and specified by the same parallax number are in a parallel relationship, the principal beams follow trajectories such that the beams are directed to the viewing area and parallel to one another while being shifted from one another by a distance equal to the pitch of the exit pupils. That is, the trajectories of the principal beams 13 are shifted from one another by a value Δshift n (n: a natural number equal to or greater than 2) or m/n (m: a natural number equal to or greater than 1) times as large as the pixel width. That is, the principal beams 13 are directed to the viewing area while being shifted from one another. In other words, when the pixel group 4 specified by a reference line A (for example, an optical axis) and the lens 3A corresponding to the pixel group 4 are defined as references on the viewing area, a pixel group adjacent to this pixel group 4 is projected on the same viewing area surface 12 through the adjacent lens 3A. Thus, as shown in FIG. 5, the parallax component images are projected on the viewing area surface 12 so that the pixel groups are shifted by the value Δshift. Consequently, when a pixel boundary magnified by one of the lenses 3A for observation is present at the visual distance as shown in FIG. 5, the observer observes an area magnified by the adjacent lens 3A at a position slightly shifted from the pixel boundary. That is, it appears to the observer that the positions magnified by the lenses 3A are slightly shifted from one another. The projected parallax component images 15A are generated on the viewing area surface so as to be shifted from one another. A line joining the lens pupil with the center of the pixel corresponds to the principal beam 13 emitted from the pixel, thus determining the direction (also the direction of the corresponding parallax number) in which the principal beam 13 is emitted. That is, the direction is determined in which the image to be displayed at that pixel is acquired.

According to the 1D-II scheme, the pixel group corresponding to the lens 3A is fixed, and the different parallax component images are provided for the respective pixel groups. In this case, pieces of parallax information are separated from an image acquired by a single parallel projection (horizontal parallel projection) and provided for the different pixel groups. That is, it appears to the observer that the parallax information belonging to the same parallax number is displayed at every plural lenses 3A in the display area and that the parallax information 15 specified by that parallax number appears to vary continuously in the screen. When making observation with one eye from the position of the reference line A, shown in FIG. 5, the observer observes the boundary between the pieces of parallax information (parallax component images) magnified by the lens 3A located in front of the observer and an image with parallax number −1 displayed by the lens 3A located on the right side of the front lens 3A. As the observer moves rightward, the parallax number of the observed image decreases. Furthermore, the observer observes a parallax component image with parallax number +1 magnified by the lens 3A located on the left side of the front lens 3A. As the observer moves leftward, the observed parallax number increases. As the observer shifts the observation position rightward, the parallax number that can be observed via the lens 3A increases. As the observer shifts the observation position leftward, the parallax number that can be observed via the lens 3A decreases. In FIG. 5, the parallax component images behind the lenses 3A are arranged so that the right side corresponds to a negative side, while the left side corresponds to a positive side. The positive parallax component images are acquired from the right side of the observer located opposite the center of the display, while the negative parallax component images are acquired from the left side. Thus, as the observation position shifts rightward, the parallax number increases.

A shorter visual distance reduces the number of lenses 3A that can project the pieces of parallax information specified by the same parallax number. Each substantially projective image is thus composed of a large number of parallel projected images. A longer visual distance increases the number of lenses 3A that can project the pieces of parallax information specified by the same parallax number. Thus, when making observation at infinity, the observer observes images with a single parallax image number (that is, parallel projected images).

Figure 6A:
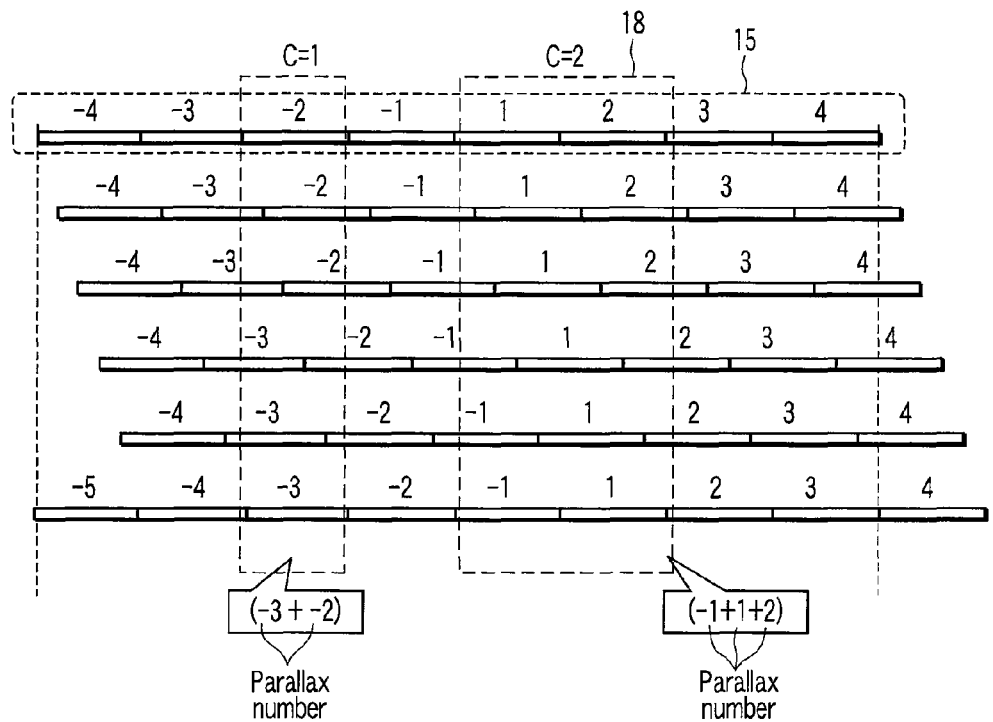

With reference to FIG. 6A, description will be given of how a three-dimensional image is viewed depending on the number of sub-pixels observed via the lenses 3A in connection with cross talk. With the lenses 3A, the cross talk may be caused by the degree of defocusing of the lenses 3A or the curvature of the image surface. With the slits, the cross talk may be caused by the opening width of the slits. The area observed via the lens cannot be infinitesimal. In actuality, the area viewed via one lens has a finite width in order to prevent possible luminance nonuniformity resulting from the magnification of pixel boundaries in a black matrix or the like in a two-dimensional image display apparatus, that is, possible moire, and to allow the pixel observed via the lens, that is, the camera number (corresponding to the parallax number) to be consecutively switched. For example, even if the width of the area is perfectly equal to the horizontal width of the sub-pixels (c=1), with the 1D-II scheme, the cross talk may occur in front of the screen on the basis of the phenomenon in which the parallax number observed via the lens 3A is switched as described above.

Figure 6B:
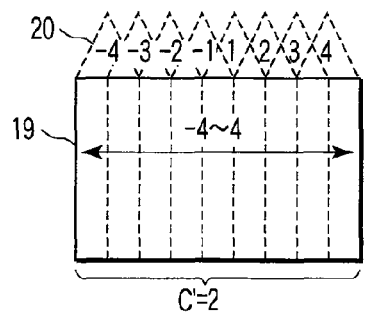
Figure 6C:
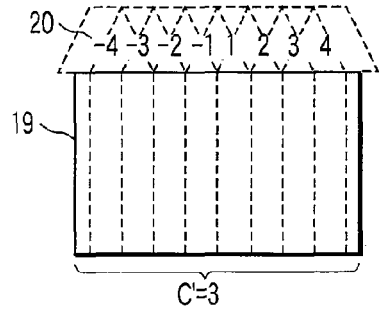

In FIG. 6A, the parallax numbers are assigned symmetrically with respect to the center of the display section 2. However, for example, when viewing, in the projected parallax component image, the parallax information or parallax component image no. −2 via one of the lenses 3A, the observer simultaneously views a small part of the parallax information no. −3. The observer views, in the projected parallax component image 15A, 50% of the parallax information no. −2 and 50% of the parallax information no. −3 via the further adjacent lens 3A. The observer views only the parallax information no. −3 in the projected parallax component image 15A via the next adjacent lens 3A. The observer simultaneously views the parallax information no. −4 via the further adjacent lens 3A. That is, substantially all over the area of the screen, two pieces of parallax information (parallax component images) are viewed on average as the camera number varies. Namely, even when one parallax component image is assumed to be observed via each of the lenses 3A (C=1), the amount of the cross talk C' on the entire screen is 2 (C'=2). Thus, as shown in FIG. 6B, two parallax component images are viewed via each lens 3A over a range 18 (area) on the display surface 19 as shown at reference numeral 20. Similarly, when two parallax component images are assumed to be observed via each of the lenses 3A (C=2), the amount of the cross talk C' on the entire screen is 3 (C'=3). Thus, as shown in FIG. 6C, three parallax component images are viewed via each lens 3A over the range 18 (area) on the display surface 19 as shown at reference numeral 20. The presence of the cross talk on the entire screen allows the parallax information to be smoothly switched. The observer thus views, with both eyes, the parallax information as viewed substantially from the observer's position. However, when a significant protrusion or depth results in a large difference (parallax) between pieces of parallax information, the pieces of parallax information cannot be merged together. As a result, for C'=2, a double image is viewed, and for C'=3, a triple image is viewed.

Figure 7A:
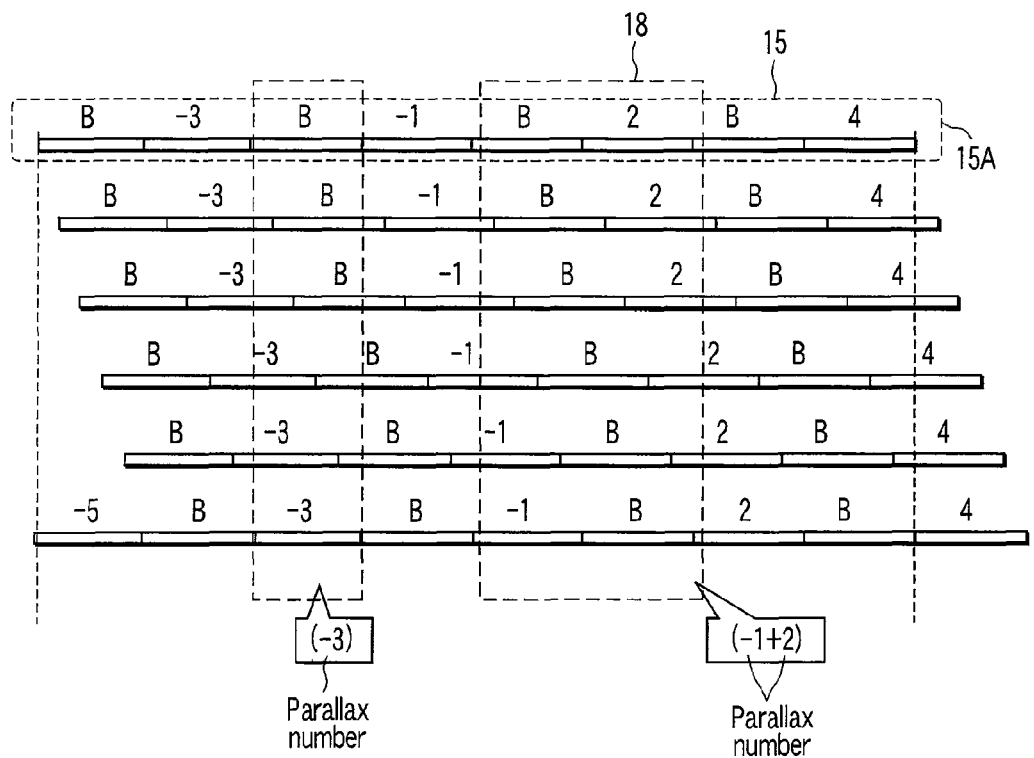
Figure 7B:
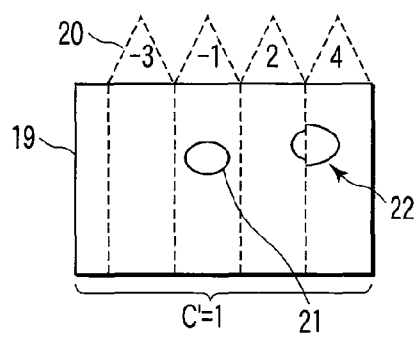
Figure 7C:
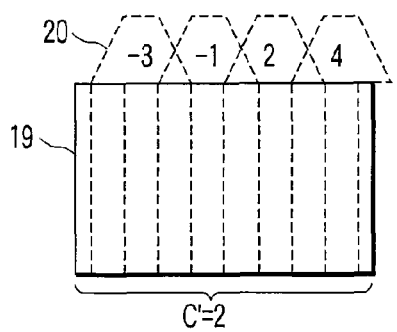

JP-A 2004-212666 (KOKAI) describes the provision of pixels not displaying any parallax information or parallax component images. FIG. 7A shows the pixels not displaying any parallax information or parallax component images as disclosed in JP-A 2004-212666 (KOKAI). The non-display pixels reduce the number of pieces of parallax information viewed via each of the lenses 3A and thus the amount of cross talk on the entire screen. As shown in FIG. 7B, even if one parallax component image is observed via each of the lenses (C=1), the amount of the cross talk C' on the entire screen can be set at 1 (C'=1). This makes it possible to avoid the multiplication in which the image is viewed double as shown at reference numeral 21. However, the non-display pixels cause an image located at a position where the parallax number is switched to appear inconsecutive as shown at reference numeral 22. This technique may reduce luminance and vary brightness among the lenses 3A. This may in turn cause moire to significantly degrade image quality. As shown in FIG. 7C, if two parallax component images are assumed to be observed via each of the lenses 3A (C=2), a double image may remain in an area in which the parallax number is switched. Furthermore, moire may still occur, resulting in an unwatchable image if any appropriate action is taken.

In contrast, this problem can be solved by the embodiment of the present invention which assigns the same-eye-point parallax component image to a display area on the display section 2 in which at least parallax component images are otherwise displayed as shown in FIG. 3.

Figure 8A:
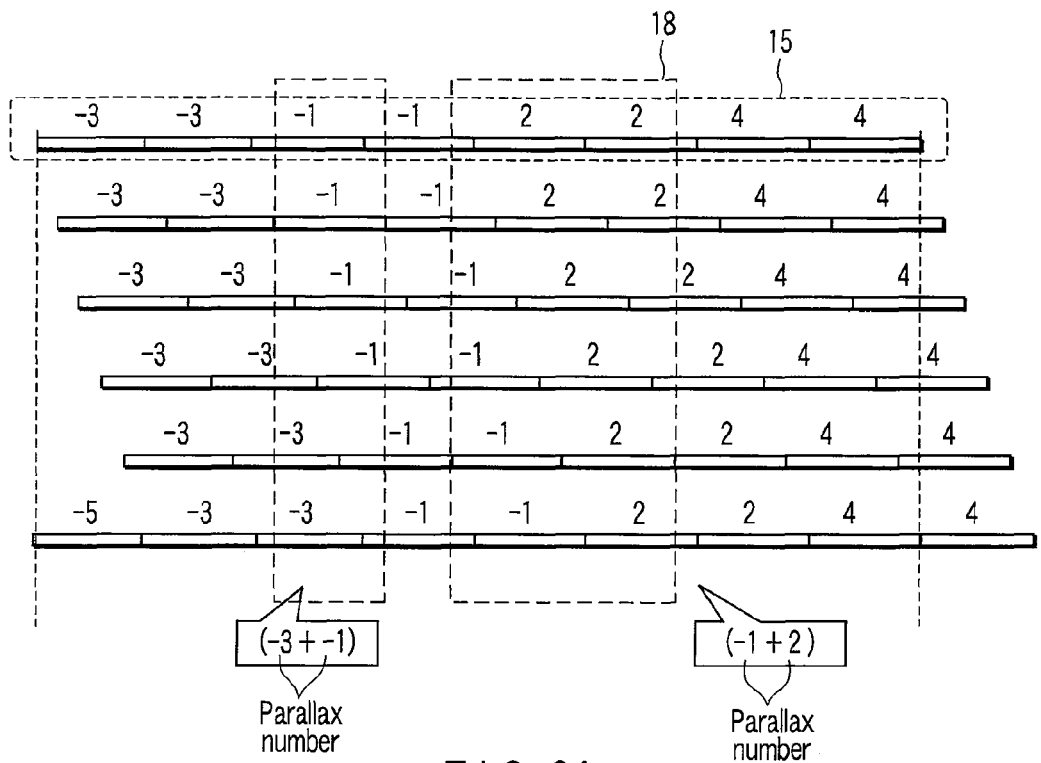

FIG. 8A shows how the parallax component images are viewed from the observation position when the same-eye-point parallax component image is assigned to the display area on the display section 2 in which at least two adjacent parallax component images are displayed.

Figure 8B:
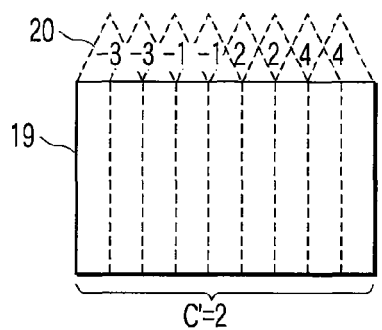
Figure 8C:
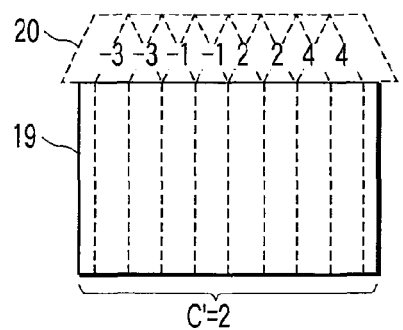

FIGS. 8B and 8C show how the entire screen of the display section 2 is viewed if one parallax component image is assumed to be observed via each of the lenses 3A (C=1) and if two parallax component images are assumed to be observed via each of the lenses 3A (C=2), respectively. As shown in FIG. 8A, if parallax component images with parallax numbers −n through 1 to n are displayed on the display surface, for example, parallax component images with parallax numbers −5 to 5 are displayed, then for example, the parallax component images with parallax numbers −4, −2, 1, and 3 are decimated. As a result, the parallax component images with scattered parallax numbers −5, −3, −1, 2, and 4 are displayed in a continuous display area. Thus, in the examples shown in FIGS. 8B and 8C, the parallax component images with scattered parallax numbers −5, −3, −1, 2, and 4 are projected and observed by observer. In the present embodiment, the cross talk on the screen (image multiplication) is inhibited, preventing possible moire.

However, the method of decimating the parallax information in accordance with the present embodiment has the following disadvantage. A rounded model (having a depth varying continuously in the vertical direction) gradually comes to appear like a divided image (a video in which plane images overlap one another in the depth direction). In this case, the increased intervals at which the parallax information is presented prevent a continuous variation in depth from being expressed (only the edges are expressed). Thus, obviously, in view of this problem, the present technique of decimating parallax information is effective on an area in which possible cross talk causes the protrusion or depth limit to be exceeded, leading to a disadvantageous multiplied image (for that area of a model with an insignificant protrusion or depth which does not suffer the multiplied image problem, the decimation is preferably avoided because the parallax information is useful for correctly expressing the model).

Figure 9:
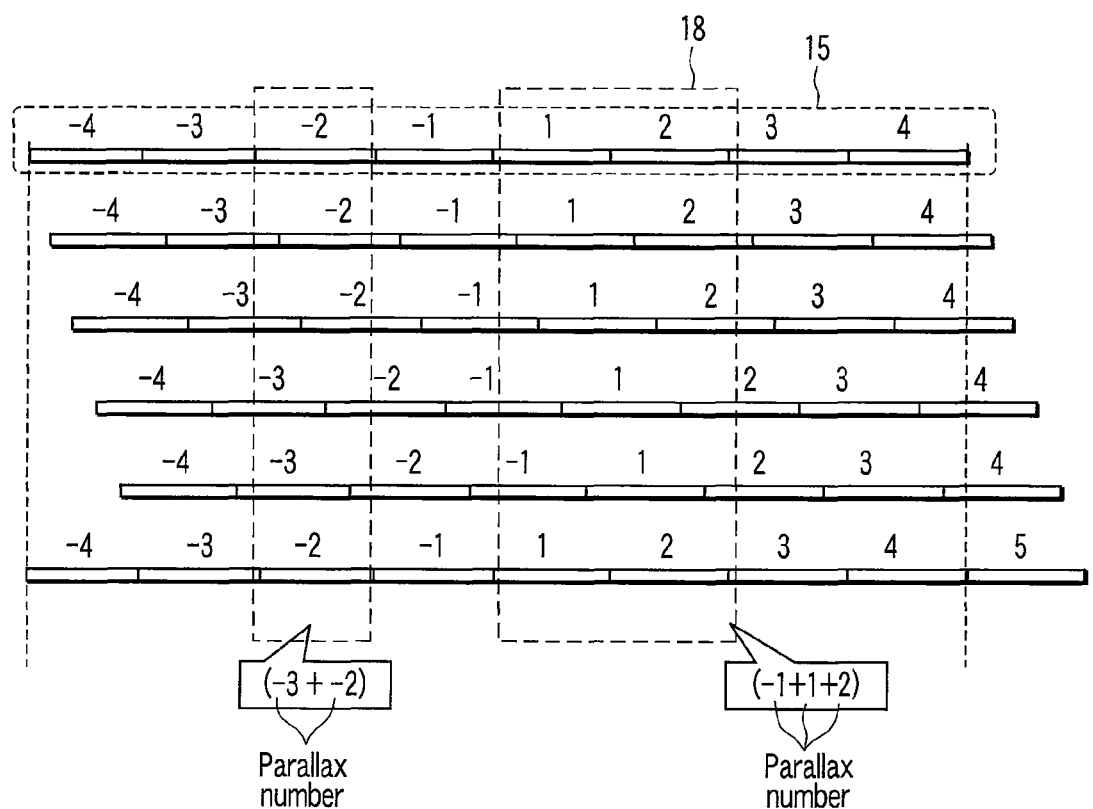
FIG. 9 is a diagram illustrating how parallax information is viewed on the display apparatus shown in FIG. 1, on the basis of multi-lens display in accordance with the II scheme in the comparative example.

Now, multi-lens arrangement in accordance with II will be described as a comparative example. The multi-lens arrangement in accordance with II is a technique of making the parallax numbers constituting the entire element images substantially the same in the three-dimensional image display apparatus based on the 1D-II scheme. The phrase "substantially the same" means that the layout is such that when the observer makes observation with one eye from a position at visual distance set to maximize the viewing area width, a single parallax number is viewed all over the screen. The phrase "substantially the same" means that with the 1D-II scheme, when the viewing area width is to be maximized at a finite visual distance and if Np is a natural number equal to or greater than 2, then even though the number of pixels constituting each of the element images is either Np or (Np+1), a single parallax number is considered to be viewed all over the screen when the observer observes the image with one eye from a certain position. Here, the shape of the viewing area changes from that shown in FIG. 4C to that shown in FIG. 4B as the number of element images each made up of (Np+1)

pixels increases. As disclosed in JP-A 2005-331844 (KO-KAI), with the multi-lens layout, a more accurate three-dimensional image can be displayed by creating an array of element images from parallax component images picked up in a projective manner at the visual distance in accordance with the intervals of beams in the horizontal direction. FIG. 9 shows how the image is viewed, at a certain visual distance, on the display apparatus in accordance with the multi-lens scheme for II. In this figure, unlike FIG. 8A, the arrangement of pieces of parallax information in the lowermost stage is such that substantially the same parallax number is viewed via all the lenses 3A from a certain position. Arranging the parallax component images in this layout is called the "multi-lens arrangement in accordance with II". Thus, with the multi-lens arrangement in accordance with II, the observer observes substantially one parallax number from one point at the visual distance (with one eye). Consequently, the multi-lens arrangement in accordance with II uses the same hardware as that of the 1D-II scheme, by which when observing the image from one point (with one eye), the observer views a projective image because of the consecutive switching of the parallax image number within the screen, but differs from the 1D-II scheme only in the method of creating parallax component images and the layout of the parallax numbers (camera numbers).

Even with the multi-lens arrangement in accordance with II, the possible cross talk on the entire screen can be reduced by providing a plurality of sub-pixels with the same parallax information.

Figure 10A:
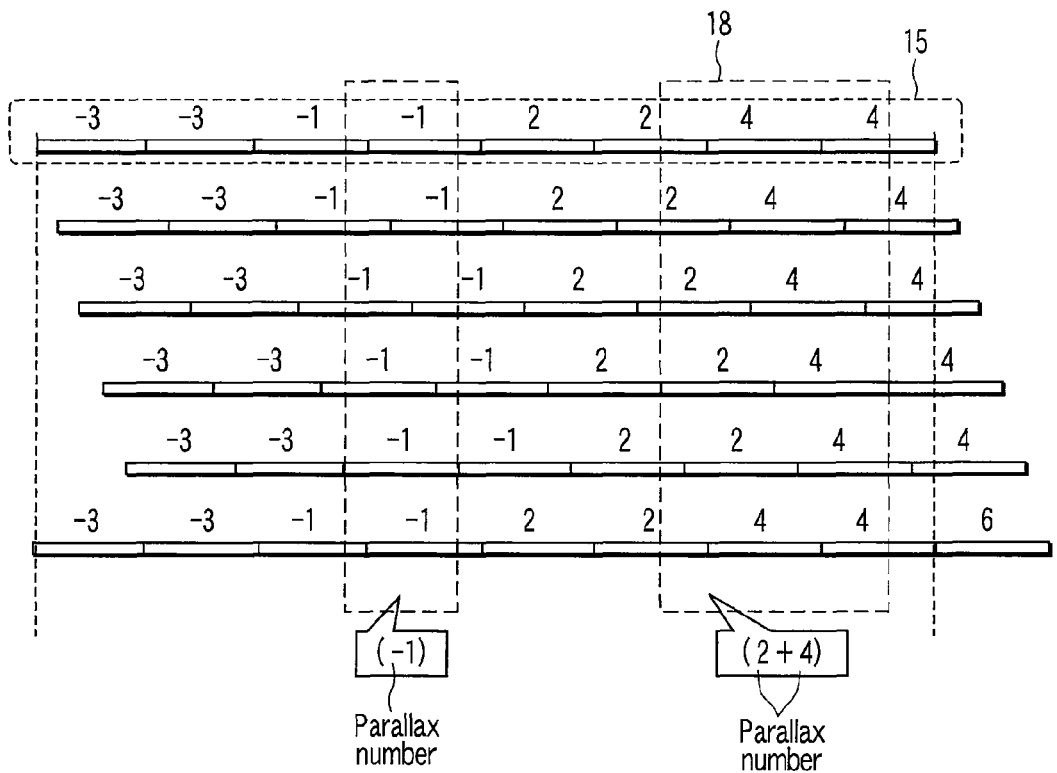
Figures 10B, 10C:
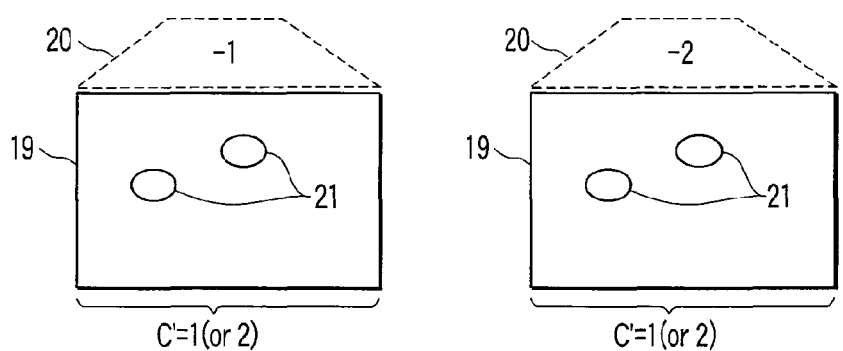

FIG. 10A shows an example of the multi-lens arrangement in accordance with II in which the parallax component images are decimated and in which the same-eye-point parallax component image is assigned to a display area on the display section 2 in which at least two adjacent parallax component images are otherwise displayed. If one parallax component image is assumed to be observed via each of the lenses 3A (C=1), the amount of the cross talk C' on the entire screen can be set at 1 (C'=1) as shown in FIG. 10B or 10C. This makes it possible to perfectly prevent even a three-dimensional image located beyond the front-rear display area from being multiplied. However, if the observation position shifts rightward or leftward, the movement parallaxes naturally become inconsecutive (flipping), and the image appears like a multi-lens display image.

FIGS. 10B and 10C show how the entire screen of the display section 2 is viewed if one parallax component image is assumed to be observed via each of the lenses 3A (C=1) and if two parallax component images are assumed to be observed via each of the lenses 3A (C=2), respectively.

In the above discussion, the 1D-II scheme has been described. However, a similar discussion is applicable to the multi-lens scheme with cross talk. That is, providing a plurality of pixels with the same parallax information is effective for inhibiting a three-dimensional image from being degraded by the multiplication of the image which results in the excess of the protrusion or depth limit.

Now, description will be given of effects on a model imposing heavy loads on rendering as described in (2). Displaying the same image at a plurality of pixels may prevent the correct expression of rounded three-dimensional expressions and the provision of appropriate movement parallaxes. In this case, a rounded model image is not displayed by a continuous surface, and the rounded model appears to be divided into a plurality of pieces. Furthermore, the plurality of pieces are displayed inconsecutive. Such display is called a division effect on a rounded model. The movement parallax means a change in parallax which occurs when the observation position shifts in the horizontal direction, or in a motion picture, a change in the position of the model which occurs when the model moves in the horizontal direction. The parallax image may prevent the three-dimensional image from being correctly observed. The division effect and the effect based on the movement parallax are easily perceived in still images but not in motion pictures. This is because importance is attached to the rounded expression or the correct movement parallax when the observer carefully views the object. For motion pictures, in which the image varies constantly and the observer does not substantially change the observer's position in observing the model, the abode-described degradation tends to be unnoticeable. On the other hand, multi-lens rendering imposes heavy loads on image creation. This may be a major cause of a decrease in the refresh rate in real-time rendering. The decrease in refresh rate is the very easily perceivable degradation of image quality. That is, for many scenes in motion pictures, maintenance of the fresh rate is more desirable than a reduction in the number of eye points.

Figure 11A:
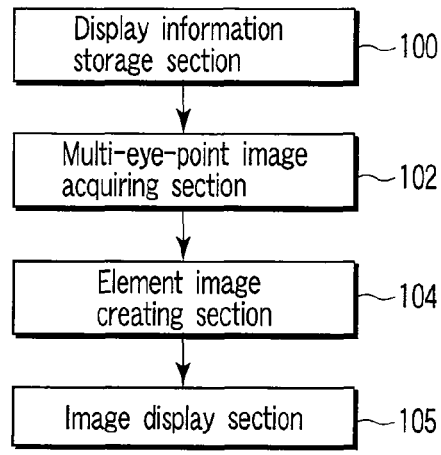
FIG. 11A is a flowchart showing a process of generating element images displayed on the display apparatus shown in FIG. 1.

FIG. 11 is a flowchart showing a procedure of processing an image in accordance with the embodiment of the present invention. In the basic flow of image processing, information for the image display apparatus, that is, information for the display is prepared, such as two-dimensional display parameters, viewing parameters Dn and Df, and lenticular sheet parameters which are shown in Table 1. The information is stored in a storage section 100 shown in FIG. 11A. A multi-lens image reflecting the information is then created by a multi-lens image acquiring section 102. Specifically, an image of a three-dimensional object as a subject is picked up with a multi-lens camera, or a multi-lens image is created by real-time rendering. An element image creating section 104 subsequently converts the image from the multi-lens camera into element images. That is, the image from the multi-lens camera specified by parallax numbers is divided into parallax component images. The parallax component images specified by the respective parallax numbers are collected to generate element images. The generated element images are displayed on a display surface of an image display section 105 in association with exit pupils. The element images are projected on the viewing area via the exit pupils so as to allow a three-dimensional image to be observed in the viewing area.

Figure 11B:
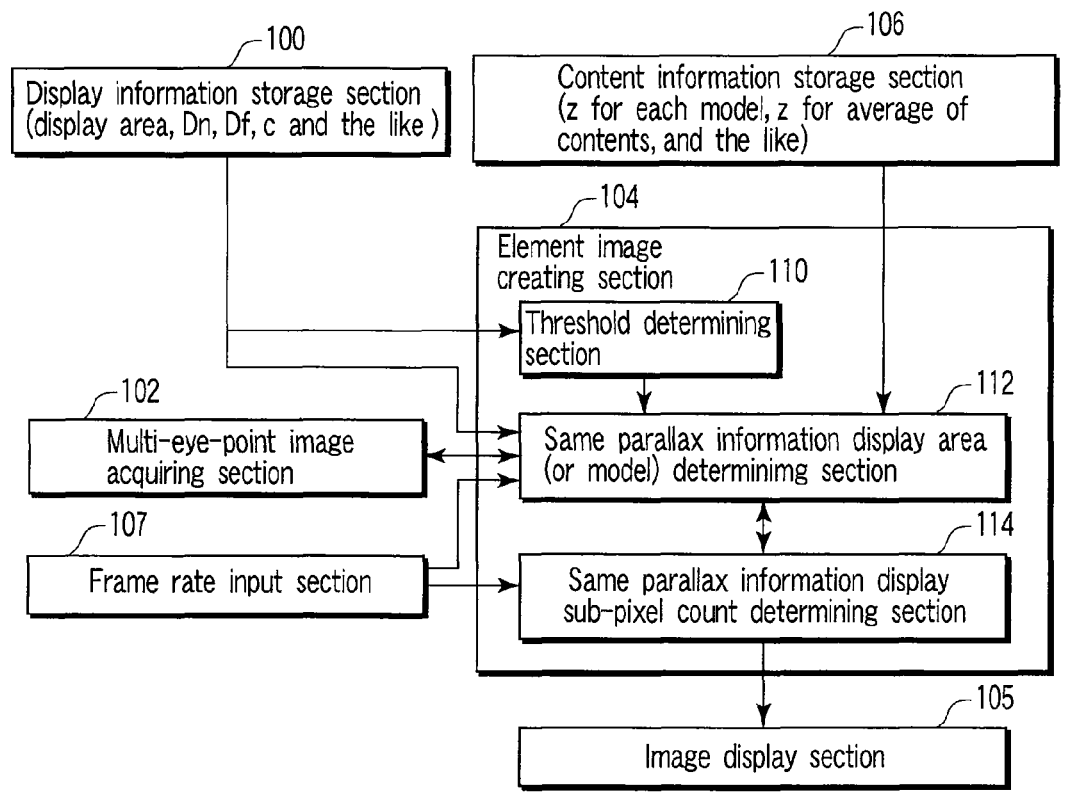
FIG. 11B is a flowchart obtained by improving the flowchart of the generation process in FIG. 11A and showing a process of generating element images in accordance with the embodiment of the present invention.

As shown in FIG. 11B, in addition to the display information storage section 100, the apparatus comprises a model information storage section 106 that stores, for each display model, an observer-side surface (z_m) and the center of gravity of the model, and a frame rate input section 107 that specifies a frame rate. The display information storage section 100, the model information storage section 106, and the frame rate input section 107 supply data to the element image creating section 104.

As shown in FIG. 10B, the element image creating section 104, which creates element images, comprises a threshold determining section 110 that determines a threshold, a same parallax information display area determining section 112 that determines models or areas in which the same parallax information is displayed on the basis of the threshold determined by the threshold determining section 110, and a same parallax information display sub-pixel count determining section that determines the number of sub-pixels at which the same parallax information is to be displayed. Display information (Dn, Df, C(cross talk amount)) is required to determine the areas in which the threshold and the same parallax information are to be displayed. The display information (Dn, Df, C(cross talk amount)) is thus supplied by the display information storage section 100. Model display position information is also required to determine the models or areas in which the same parallax information is to be displayed. The model display position information (z_m, z_o) is thus supplied by the model information storage section 106. Furthermore, when the desired frame rate is input to the apparatus, the number of sub-pixels at which the same parallax information is to be displayed is calculated back. However, the areas in which the same parallax information is to be displayed are automatically set all over the screen. The result of the setting is reflected in the multi-lens image acquiring section.

The display apparatuses in accordance with the present embodiment and the comparative example are each composed of the two-dimensional image display liquid crystal panel 2 (resolution: WUXGA) and the lenticular sheet 3, both shown in Table 1. The performance of the three-dimensional image display apparatus varies depending on the type of the lenticular sheet. In Table 1, the type of the lenticular sheet is specified on the basis of PT (panel type) described below. The vertical lens 3A in Table 1 means a lenticular sheet having cylindrical lenses 3A arranged on the lenticular sheet so that the ridge of the cylindrical lenses 3A coincides with the vertical direction of the liquid crystal panel (LCD). The oblique lens 3A in Table 1 means a lenticular sheet having cylindrical lenses 3A arranged on the lenticular sheet so that the ridge of the cylindrical lenses 3A lies at an angle θ to the vertical direction of the liquid crystal panel (LCD)

TABLE 1

| | Parameters | Notation of parameter | Unit | PT < 10000 | | PT ≥ 10000 | |
|---|---|---|---|---|---|---|---|
| | | | | PT = 0 | 0 < PT < 10000 | PT = 10000 | 10000 < PT |
| Parameter of two dimensional display | Number of horizontal pixel | nx | pixel | Design value | | | |
| | Number of vertical pixel | ny | pixel | Design value | | | |
| | Display panel width | W | mm | Design value | | | |
| | Display panel height | H | mm | Design value | | | |
| | Pixel pitch | pp | mm/pixel | W/nx, H/ny | | | |
| Lenticular sheet parameter | Number of parallaxes | Np | Parallaxes | Design value | | | |
| | Lens type | PT | — | 0: Vertical lens, 4: Inclined lens (1), 5: Inclined lens (2), 10000: Multi-eye vertical lens, 10004: Multi-eye inclined lens (1), 10005: Multi-eye inclined lens (2) | | | |
| | Air converted gap | g | mm | Design value | | | |
| | Horizontal lens width | pe | mm | pp/3 × nx | pp/3 × Np × 3/PT | pp/3 × nx × (L/(L + g)) | pp/3 × nx × 3/(PT − 10000) × (L/(L + g)) |
| Observing parameter | Visual distance | L | mm | Design value | | | |
| | Element image width | P | sub-pixel | Np × (L + g)/L | Np × (L + g)/L × 3/PT | Np | Np × 3/(PT − 10000) |
| | Viewing area (one side) | θ | degree | atan(P × (pp/3) × L/g/2/L) | | atan(P × (pp/3) × L/g/2/L) | |
| | Maximum spatial frequency to be displayed (horizontal direction) | βmax | cpr | L/(2 × (pp/3) × Np) | L/(2 × (pp/PT) × Np) | L/(2 × (pp/3) × Np) | L/(2 × (pp/(PT − 10000)) × Np) |
| | Assurance spatial frequency (user's input) | βuser | cpr | Design value | | | |
| | Spatial frequency for calculating a protrusion and depth limit | β | cpr | | | βuser < βmax → βuser, βuser ≥ βmax → βmax | |
| | Protrusion limit | Dn | mm | L/(2 × ((L + g)/L) × pp/g/3 × β + 1) | L/(2 × ((L + g)/L) × pp/g/PT × β + 1) | L/(2 × ((L + g)/L) × pp/g/3 × β + 1) | L/(2 × ((L + g)/L) × pp/g/ (PT − 10000) × β + 1) |
| | Depth limit | Df | mm | −L/(2 × ((L + g)/L) × pp/g/3 × β − 1) | −L/(2 × ((L + g)/L) × pp/g/PT × β − 1) | −L/(2 × ((L + g)/L) × pp/g/3 × β − 1) | −L/(2 × ((L + g)/L × pp/g/PT − 10000 × β − 1) |
| Photographing parameter | Camera interval | nc | — | (pp/3)/g | (pp/3)/g × 3/PT | (pp/3)/g | (pp/3)/g × 3/ (PT − 10000) |
| | number of multi-lens cameras | Nc | camera | Obtain integer by rounding ((obtain integer | Obtain integer by rounding ((obtain integer | | Np |

TABLE 1-continued

| Parameters | Notation of parameter | Unit | PT < 10000 | | PT ≧ 10000 | |
|---|---|---|---|---|---|---|
| | | | PT = 0 | 0 < PT < 10000 | PT = 10000 | 10000 < PT |
| | | | by rounding off (nx × 3/2/P) × (P − Np))) × 2 + Np | by rounding off (nx × 3/2/P) × (P × PT/ 3 − Np))) × 2 + Np | | |

The vertical lens 3A in accordance with the II scheme is expressed by PT=0 (angle θ=0).

For the oblique lens 3A in accordance with the II scheme, arrangement at the angle θ=a tan(¼) is expressed by PT=4.

For the oblique lens 3A in accordance with the II scheme, arrangement at the angle θ=a tan(⅕) is expressed by PT=5.

The vertical lens 3A in accordance with the multi-lens system is expressed by PT=10000.

For the oblique lens 3A in accordance with the multi-lens scheme, arrangement at the angle θ=a tan(¼) is expressed by PT=10004.

For the oblique lens 3A in accordance with the multi-lens scheme, arrangement at the angle θ=a tan(⅕) is expressed by PT=10005.

Therefore, PT<10000 means the II scheme, and PT≧10000 means the multi-lens scheme. Furthermore, 0<PT<10000 means the adoption of the oblique lens 3A for the II scheme, and 10000<PT means the adoption of the oblique lens 3A for the multi-lens scheme.

The two-dimensional display panel used as described in Table 1 has a horizontal pixel count nx and a vertical pixel count ny, as well as a display surface width (panel width) W and a display surface height (panel height) H. The arrangement pitch (pixel pitch pp) of the pixels is set equal to a horizontal pitch W/nx in the horizontal direction and to a vertical pitch H/ny in the vertical direction.

The parallax count nx is the number of pieces of parallax information and will be described below in conjunction with a case in which parallax information is provided only in the horizontal direction. That is, parallax information is provided on the rear display surfaces of the lenses 3A at a sub-pixel pitch (pp/3). In the description of the embodiment, the vertical lens 3A placed at a certain angle to the vertical direction provides 12 parallaxes, and the obliquely placed oblique lens 3A (θ=a tan(¼) provides 16 parallaxes. For the oblique lens 3A, the assignment of the parallax information can be performed not only in the horizontal direction but also in the vertical direction. As is apparent from Table 1, an arithmetic expression for the horizontal pitch pe (corresponding to a horizontal width pe) of the lenses 3A differs between the vertical lens 3A and the oblique lens 3A. Specifically, the oblique lenses 3A, arranged at the angle θ=a tan(¼), enable the horizontal distribution pitch of parallax information to be increased by a factor of 4/3. This substantially corresponds to a decrease in horizontal sub-pixel pitch. The horizontal lens pitch obtained when the oblique lens 3A is used to distribute the 16 parallaxes is equal to the lens pitch obtained when the vertical lens 3A is used to distribute the 12 parallaxes. According to the 1D-II scheme, the horizontal lens width is such that owing to the lack of a beam converging point, the horizontal pitch pe of the lenses 3A is set integer times (parallax count times) as large as pp/3. According to the multi-lens scheme, when the distance between the beam control element and the two-dimensional display panel is defined as g and the observation distance is defined as L, the horizontal pitch pe is set L/(L+g) times as large as a value integer times (parallax count times) as large as pp/3 so as to provide a beam converging point.

The air converted gap (g) in Table 1 is the gap from the exit pupil of each lens 3A to the pixel surface of the two-dimensional image display device. This value is determined taking into account the refractive index of the lens 3A main body, glass constituting the liquid crystal display, or an optical member such as a polarizing plate. The gap (g) allows the viewing area (θ) for the three-dimensional image display apparatus to be determined. That is, a larger gap (g) reduces the viewing area. With the same number of parallaxes, the reduced viewing area θ increases the interval of beams and thus the front-rear display range (Dn, Df).

The visual distance (L) is the distance from the display surface to the observer. According to the 1D-II scheme, no beam converging point needs to be provided, but the position of a beam converging point needs to be assumed in order to maximize the viewing area width at a viewing distance as described in JP-A 2004-212666 (KOKAI). The element image width P corresponds to the width of a group of sub-pixels required to display an element image that is a group of pieces of parallax information corresponding to each lens 3A. According to the multi-lens scheme, the number of pixels arranged behind each lens 3A is an integer. On the other hand, according to the 1D-II scheme, by which the viewing area is enlarged simply on the basis of the layout of a group of element image display pixels corresponding to the lens 3A with the beams set in a parallel relationship, a short visual distance causes the element image to be arranged outside the lens 3A with respect to the center of the three-dimensional image display apparatus. A long visual distance causes the element image to be arranged immediately behind the lens 3A. That is, a longer visual distance makes the element pixel width P closer to the lens pitch. A short visual distance increases the element pixel width P. According to the 1D-II scheme, the element pixel width P is a non-integer, but naturally, the sub-pixels can have only an integral value. Thus, as described in JP-A 2004-212666 (KOKAI), a non-integral value can be obtained by discretely generating element images each made up of (Np+1) pixels.

The viewing area has been described. A spatial frequency β is a parameter for the spatial frequency of a model displayed on the three-dimensional image display apparatus. The maximum displayable frequency is determined by the Nyquist frequency of the horizontal lens pitch as described in H. Hoshino, F. Okano, H. Isono, and I. Yuyama, J. Opt. Soc. Am. A., Vol. 15, pp. 2059-2065 (1998). NHK. Furthermore, a guaranteed frequency βuser for a displayed three-dimensional image is separately defined. No problem occurs if the guaranteed frequency βuser is lower than the spatial frequency βmax. However, if the guaranteed frequency βuser is higher than the spatial frequency βmax, the three-dimensional image cannot be displayed without being folded back. The displayable frequency decreases with increasing depth amount as described in H. Hoshino, F. Okano, H. Isono, and I. Yuyama, J. Opt. Soc. Am. A., Vol. 15, pp. 2059-2065 (1998). NHK. The protrusion limit Dn and the depth limit Df correspond to the range within which the guaranteed frequency βuser is guaranteed.

The protrusion limit Dn and the depth limit Df depend on the intervals at which parallax information is presented, that is, the number of sub-pixels arranged behind the lens 3A in the horizontal direction. Thus, arithmetic expressions for the protrusion limit Dn and the depth limit Df differ between the vertical lens 3A and the horizontal lens 3A. The protrusion limit Dn and the depth limit Df also depend on the spatial frequency (β) of a displayed model. That is, the maximum expressible frequency of the three-dimensional image display apparatus is determined by the pitch of the lenses 3A on the display surface. As disclosed in H. Hoshino, F. Okano, H. Isono, and I. Yuyama, J. Opt. Soc. Am. A., Vol. 15, pp. 2059-2065 (1998). NHK, the expressible frequency decreases with increasing distance from the display surface, but the displayable range decreases with increasing spatial frequency of the model to be displayed, while increasing with decreasing spatial frequency. That is, for βmax>βuser, the display range (Dn, Df) may be calculated using βuser. Given that the frequency of the model to be displayed is defined as βmax, the display position is such that the interval of beams emitted from the lens 3A is limited so that the interval is equal to the lens pitch. A model with a frequency higher than βmax cannot be displayed on the three-dimensional image display apparatus in accordance with the embodiment of the present invention.

A camera interval (nc) is given in the form of the ratio of the camera interval to the visual distance (L) and specifically corresponds to the intervals at which parallax information is presented at the visual distance.

Finally, the number of cameras will be described. A plurality of pixels on the liquid crystal panel are laid out for each lens 3A and are called a group of element image display pixels. Because of the limit on the number of pixels constituting the group of element image display pixels, the viewing area for each lens 3A is also limited. The viewing areas for the respective lenses 3A need to overlap one another at the assumed visual distance with the beams kept parallel to one another. Thus, with a short assumed visual distance, the group of element image display pixels is laid outside the lens 3A with respect to the center of the screen as shown in FIG. 2B. With a longer assumed visual distance, the group of element image display pixels is laid immediately behind the lens 3A as shown in FIG. 2C. A change in the layout of the group of element image display pixels with respect to the exit pupil means a change in parallel projected eye point image number required to acquire parallax information for creation of an element image. Specifically, element images for a group of lenses located on the left side of the display center require parallax information from an eye point image acquired at a more rightward position. Element images for a group of lenses located on the right side of the display center require an eye point image acquired at a more leftward position. This increases the number of eye point images above that of pixels constituting the group of element image display pixels as described in JP-A 2004-212666 (KOKAI). Thus, according to the 1D-II scheme, the number of multi-lens cameras depends on the viewing distance. However, in accordance with the multi-lens scheme, by which a beam converging point is provided at the visual distance, the number of cameras is equal to that of parallaxes.

Description will be given below of embodiments in which the present invention is applied to the three-dimensional image display apparatus based on the arithmetic expressions shown in the table.

Embodiment 1

Figure 12:
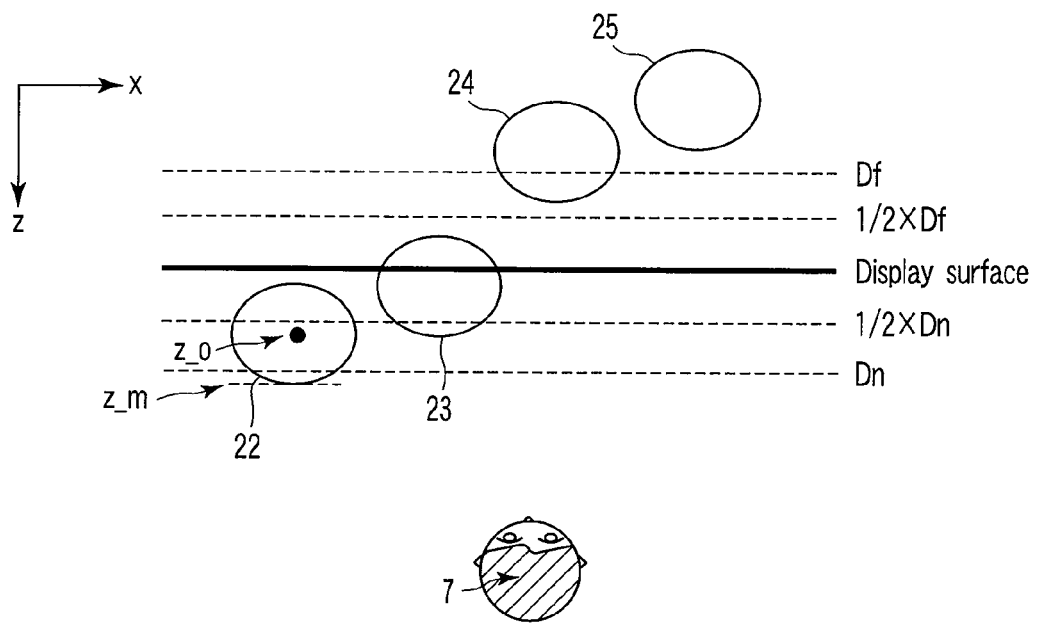
FIG. 12 is a diagram illustrating the positions at which models are displayed on the display apparatus shown in FIG. 1.

The Vertical Lens in Accordance with the 1D-II Scheme Depending on the Display Position Description will be given of a case in which PT=0 (vertical lens 3A) and the number of parallaxes is 12. The observation distance was set at 700 mm. Even with the 12 parallaxes, the number of multi-lens cameras required to provide one screen is 22 in order to maximize the viewing area width at the observation distance of 700 mm. Detailed descriptions are omitted here. With this three-dimensional image display apparatus, when the spatial frequency of the model to be displayed is 320 cpr, the front display limit (Dn) and the rear display limit (Df) are only 23.7 mm and 25.4 mm, respectively. It has been found that with this three-dimensional image display apparatus, 2 sub-pixels (C=2) are observed, on average, via one lens 3A at the viewing distance. In this case, the amount of cross talk (C') on the screen is 3 as shown in FIG. 4C. For those of the models displayed on the three-dimensional image display apparatus which have an observer-side surface (z_m) displayed at a position beyond the protrusion limit Dn or the depth display limit Df, for example, as shown at reference numeral 22 or 25 in FIG. 12, the same parallax component image is determined to be displayed at a plurality of pixels. The (3n+1)th piece of parallax information is presented at sub-pixels at which the (3n+2)th and (3n+3)th (n≧0) pieces of parallax information are conventionally presented, with the same piece of parallax information presented at every three sub-pixels. For models having an observer-side surface displayed at a position beyond ½×Dn or Df, for example, as shown at reference numeral 22 or 25 in FIG. 12, the same parallax component image is determined to be displayed at a plurality of pixels. The (2n+1)th piece of parallax information is presented at a sub-pixel at which the (2n+2)th piece of parallax information is otherwise presented, with the same piece of parallax information presented at every two sub-pixels. As a result, a three-dimensional image with a significant protrusion or depth was successfully naturally inhibited from being multiplied. Relevant determinative expressions are shown below.

$z\_m > Dn$ or $z\_m < Df$ →Display the same parallax information at every three sub-pixels $Dn > z\_m > \frac{1}{2} \times Dn$ or $\frac{1}{2} \times Df < z\_m < Df$ →Display the same parallax information at every two sub-pixels $\frac{1}{2} \times Df \leq z\_m \leq \frac{1}{2} \times Dn$ Display the same parallax information at every other sub-pixel Here, if it is difficult to determine the observer-side surface (z_m) of the model, the center of gravity (z_o) of the model may be used instead for simplification. Furthermore, the protrusion and depth limits Dn and Df are functions of the protrusion and depth limit calculation frequency β as shown in Table 1. The protrusion and depth limits Dn and Df have values decreasing with increasing spatial frequency of the model, while increasing with decreasing spatial frequency of the model. The protrusion and depth limit calculation frequency β may be determined for each model but may be representative value for all the models. Furthermore, in the present embodiment, the values of the protrusion and depth limits Dn and Df are directly utilized as thresholds to determine the number of sub-pixels at which the same parallax information is presented. However, similar values may be used for the same purpose.

Embodiment 2

A three-dimensional image display apparatus in Embodiment 2 was the same as that in Embodiment 1 except that the cross talk amount C was 1. Possible multiplication was successfully prevented on the basis of the following determinative equation.

$$z\_m > Dn \text{ or } z\_m < Df \rightarrow \text{Display the same parallax information at every two sub-pixels}$$

Embodiment 3

The Oblique Lens in Accordance with the 1D-II Scheme Depending on the Rendering Speed Description will be given of a case in which PT=4 (vertical lens 3A) and the number of parallaxes was 16. The observation distance was set at 700 mm. Even with the 16 parallaxes, the number of multi-lens cameras required to provide one screen is 30 in order to maximize the viewing area width at the observation distance of 700 mm. Detailed descriptions are omitted here. The three-dimensional image display apparatus was used to perform real-time rendering so as to change the display in response to the observer's operation. Every time CG models created using a DirectX base are manipulated, the cameras generate respective multi-eye-point images. Appropriate software then executes a rearranging process on the images in sub-pixel units to generate element images. The element images are displayed on the two-dimensional image display device to allow a three-dimensional image to be viewed via the lenses 3A. Owing to the need for the operation of rearranging the multi-eye-point images, reducing the number of cameras to half does not simply double the frame rate. In the present embodiment, the rate y of dependence on the number of cameras was 0.5, and the same image is displayed at every two sub-pixels. Thus, in accordance with Formula (1), the following frame rate was successfully achieved.

$$f = f0 \times (0.5 + 0.5 \times 1/2)$$
$$= f0/0.75$$

(fo varies depending on the scene and is small for scenes with a larger number of polygons and large for scenes with a smaller number of polygons).

Embodiment 4

Figure 13:
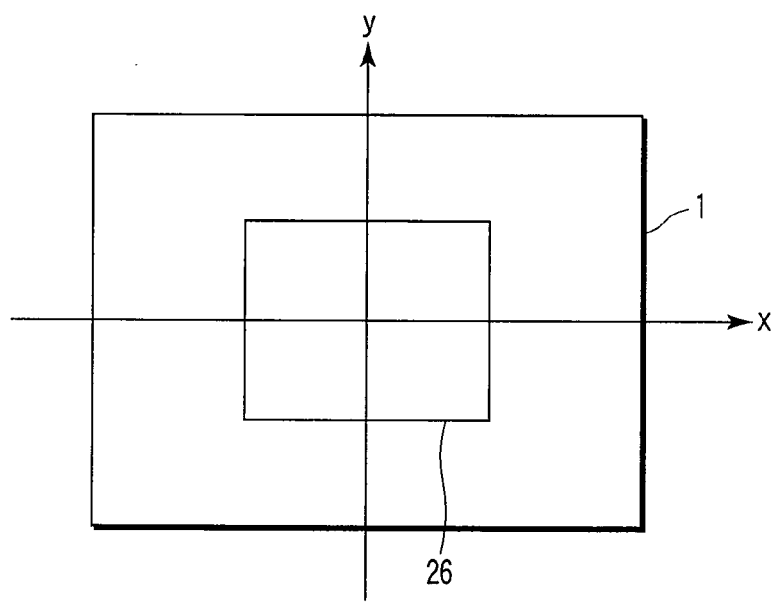
FIG. 13 is a diagram illustrating an example in which the display method in accordance with the embodiment of the present invention is applied to a particular display area on the display apparatus shown in FIG. 1.

A three-dimensional image display apparatus in Embodiment 4 was substantially the same as that in Embodiment 1 except that the horizontal pitch of the lenses 3A was set at 0.688733149, which was slightly smaller than a value 12 times as large as the horizontal width (pp/3) of the sub-pixel. A beam converging point was thus generated at the viewing distance, resulting in the multi-lens scheme with cross talk (C=2). With this three-dimensional image display apparatus, all the models with a protrusion or depth exceeding Dn or Df, respectively, were displayed in the center of the screen. No model with a protrusion or depth exceeding Dn or Df was displayed in the other areas. Thus, in an area 26 in the two-dimensional display surface shown in FIG. 13, that is, in the area with a height and a width which were half those of the screen, the same parallax information was presented at every two sub-pixels. In the other areas, the parallax component images were presented at the respective sub-pixels. Then, the images were inhibited from being multiplied all over the screen.

Embodiment 5

A three-dimensional image display apparatus in Embodiment 4 was substantially the same as that in Embodiment 1 except that the horizontal pitch of the lenses 3A was set at 0.688733149, which was slightly smaller than a value 12 times as large as the horizontal width (pp/3) of the sub-pixel. A beam converging point was thus generated at the viewing distance, resulting in the multi-lens scheme with cross talk (C=2). The number x of sub-pixels at which the same image was displayed was then determined for the entire screen of the three-dimensional image display apparatus in accordance with Formula (1), while preventing f from exceeding 30 fps. Then, the frame rate was successfully kept at 30 fps in real-time display regardless of the scene.

As described above, with the display apparatus displaying three-dimensional images in accordance with the embodiments of the present invention, the assignment of the parallax component images is changed to display a particular model.

As described in the background, JP-A2004-212666 (KO-KAI) makes the proposal relating to a model with a significant protrusion or depth. However, as described above, JP-A2004-212666 (KOKAI) is different from the display apparatus in accordance with the embodiments of the present invention in the basic technique for providing non-display pixels and the same parallax information. Furthermore, JP-A 2005-331844 (KOKAI) makes the proposal relating to a model imposing heavy loads on rendering. JP-A 2005-331844 (KOKAI) only discloses the method for applying an image with an insufficient number of eye points for the multi-lens scheme to the II scheme and describes the proposed technique based on at least three parallaxes provided taking cross talk into account.

Even if the same image is displayed at two pixels, the display apparatus in accordance with the embodiments of the present invention enables rendering loads associated with CG rendering or image pickup loads associated with live action to be sharply reduced to half. Displaying the same component image at two pixels is optimum for inhibiting the movement parallaxes from being flipped. The display apparatus in accordance with the embodiments of the present invention differs from the display apparatus disclosed in JP-A 2005-331844 (KOKAI) in the process of determining whether or not to adopt the same parallax display taking the rendering load or the protrusion or depth limit into account, as well as the mechanism for the process.

As described above, the present invention provides a three-dimensional image display apparatus based on the II scheme which reduces loads associated with creation of two-dimensional images and which prevents the possible multiplication of images even if the protrusion or depth display limit is exceeded.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A three-dimensional image display apparatus comprising:
a display device to display an image on a display area, the display device having an array of elemental areas that includes a plurality of sub-pixels arranged in an array of rows and columns;
a light control unit facing to the display unit, and including a plurality of lenses or apertures to control directions of light rays emitted from each of the elemental areas; and
a generating unit configured to generate the image to be displayed on the display area, the image including a plurality of elemental images, each of the elemental images corresponding to the lens or the aperture and including a plurality of parallax component images, the elemental images being assigned on the elemental areas in such a manner that each of the elemental images is configured to display at least two parallax component images corresponding to substantially same parallax component in at least two adjacent continuous regions in the elemental area, and light rays emerged from the elemental images being projected to different directions via the lens or the aperture.

2. The apparatus according to the claim 1, wherein the plurality of lenses or apertures substantially linearly arranged along a first direction, and each of the lenses and apertures is extended along a second direction.

3. The apparatus according to the claim 2, wherein the second direction is nonparallel to a direction of the rows and the columns in the sub-pixels.

4. The apparatus according to the claim 1, wherein the elemental image consists of two sets of the parallax component images.

5. The apparatus according to the claim 1, wherein the light control unit controls principal light rays included in the light rays emitted from the display unit to be focused on at least two points in viewing zone via the lens or aperture.

6. The apparatus according to the claim 1, wherein the light control unit controls principal rays of the parallax component images, which are included in the light rays, corresponding to substantially same parallax to be directed parallel via the lens or aperture.

7. A image processing apparatus to generate an image to be displayed in a three dimensional apparatus having a display device to display an image on a display area, the display device having an array of elemental areas that includes a plurality of sub-pixels arranged in an array of rows and columns, and a light control unit, facing to the display unit and including a plurality of lenses or apertures, and the light control unit controlling directions of light rays emitted from each of the elemental areas, the image processing apparatus comprising:
a generating unit configured to generate the image to be displayed on the display area, the image including a plurality of elemental images, the elemental image corresponding to the lens or the aperture and including a plurality of parallax component images, the elemental images being assigned on the elemental areas in such a manner that each of the elemental images is configured to display at least two parallax component images corresponding to substantially same parallax component in at least two adjacent continuous regions in the elemental area, and light rays emerged from the elemental images being projected to different directions via the lens or the aperture.

8. A method to display a image on a three-dimensional display apparatus including, a display device to display an image on a display area, the display device having an array of elemental areas that includes a plurality of sub-pixels arranged in an array of rows and columns, and a light control unit, facing to the display unit and including a plurality of lenses or apertures to control directions of light rays emitted from each of the elemental areas, comprising:
receiving a plurality of parallax component images;
generating the image to be displayed on the display area, the image including a plurality of elemental images, the elemental image corresponding to the lens or the aperture and including a plurality of parallax component images, the elemental images being assigned on the elemental areas in such a manner that each of the elemental images is configured to display at least two parallax component images corresponding to substantially same parallax component in at least two adjacent continuous regions in the elemental area, and light rays emerged from the elemental images being projected to different directions via the lens or the aperture; and
displaying the generated image on the display area.

9. A method to process a image to be displayed on a three-dimensional display apparatus including, a display device to display a image on a display area, the display device having an array of elemental areas that includes a plurality of sub-pixels arranged in an array of rows and columns, and a light control unit facing to the display unit and including a plurality of lenses or apertures, the light control unit controlling directions of light rays emitted from each of the elemental areas, comprising:
receiving a plurality of parallax component images; and
generating the image to be displayed on the display area, the image including a plurality of elemental images, the elemental image corresponding to the lens or the aperture and including a plurality of parallax component images, the elemental images being assigned on the elemental areas in such a manner that each of the elemental images is configured to display at least two parallax component images corresponding to substantially same parallax component in at least two adjacent continuous regions in the elemental area, and light rays emerged from the elemental images being projected to different directions via the lens or the aperture.

* * * * *